(12) United States Patent
Minneman et al.

(10) Patent No.: US 7,835,009 B2
(45) Date of Patent: Nov. 16, 2010

(54) APPARATUS AND METHOD TO DETECT AND CORRECT FOR MODE HOP WAVELENGTH ERROR IN OPTICAL COMPONENT MEASUREMENT SYSTEMS

(75) Inventors: Michael Minneman, Lafayette, CO (US); Greg Kern, Lafayette, CO (US); Michael Crawford, Lafayette, CO (US)

(73) Assignee: DBM Optics, Inc., Lafayette, CO (US)

( * ) Notice: Subject to any disclaimer, the term of this patent is extended or adjusted under 35 U.S.C. 154(b) by 271 days.

(21) Appl. No.: 11/733,592

(22) Filed: Apr. 10, 2007

(65) Prior Publication Data

US 2008/0043227 A1 Feb. 21, 2008

Related U.S. Application Data

(60) Provisional application No. 60/744,556, filed on Apr. 10, 2006.

(51) Int. Cl.
*G01B 9/02* (2006.01)
(52) U.S. Cl. .................................................. 356/477
(58) Field of Classification Search ................ 356/73.1, 356/477
See application file for complete search history.

(56) References Cited

U.S. PATENT DOCUMENTS

| 5,333,219 | A  | * | 7/1994 | Kuznetsov ................... 385/45 |
| 6,870,629 | B1 | * | 3/2005 | Vogel et al. .................. 356/519 |
| 7,079,253 | B2 | * | 7/2006 | North-Morris et al. ...... 356/454 |

* cited by examiner

*Primary Examiner*—Tarifur Chowdhury
*Assistant Examiner*—Jonathon D Cook
(74) *Attorney, Agent, or Firm*—Renner, Otto, Boisselle & Sklar, LLP

(57) ABSTRACT

A method of and system for correcting mode hop wavelength error in data obtained measuring optical characteristics over a number of wavelengths, includes at a location where mode hop wavelength error occurs in an assemblage of data, representing optical characteristics with respect to wavelength of incident electromagnetic energy of a device under test, compensating or correcting the data to overcome errors due to mode hop occurring in the measurement process.

34 Claims, 20 Drawing Sheets

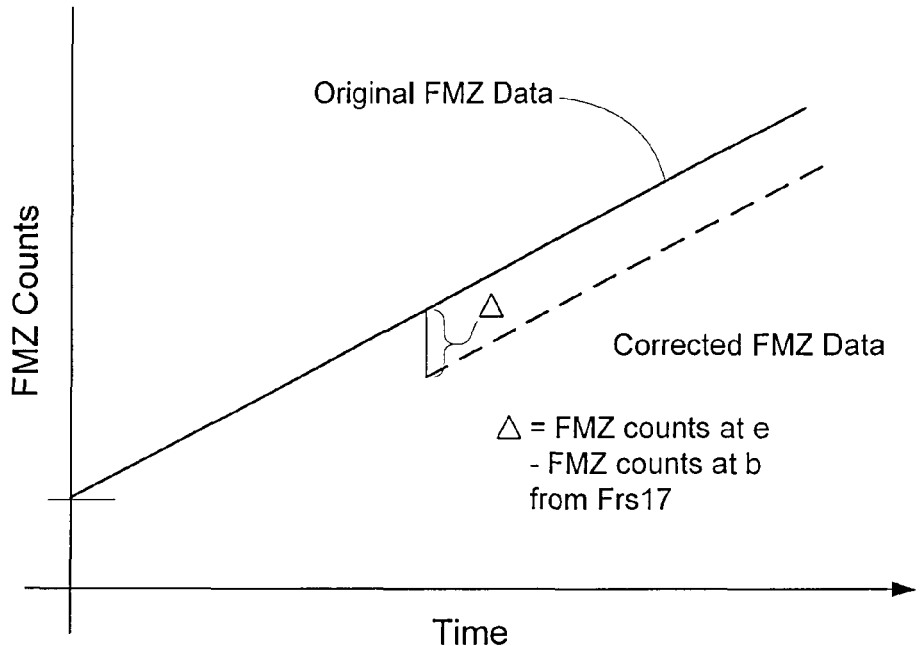

Total N Readings $\lambda \text{ Start} \rightarrow \mathcal{V} \text{ Start} = \dfrac{c}{\lambda \text{ Start}}$ $\lambda \text{ Stop} \rightarrow \mathcal{V} \text{ Stop} = \dfrac{c}{\lambda \text{ Stop}}$ FMZ Count [ 0 ] ≡ 0

FMZ Count [ N-1 ] ≡ Final_ Count $\Delta \mathcal{V} = \dfrac{\mathcal{V} \text{ Start} - \mathcal{V} \text{ Stop}}{\text{Final \_ Count}}$ $\mathcal{V}_i = \mathcal{V} \text{ Start} - FMZ_i \cdot \Delta \mathcal{V}$ $\lambda_i = \dfrac{c}{\mathcal{V}_i}$

FIG. 20

APPARATUS AND METHOD TO DETECT AND CORRECT FOR MODE HOP WAVELENGTH ERROR IN OPTICAL COMPONENT MEASUREMENT SYSTEMS

RELATED APPLICATION DATA

This application claims the benefit of U.S. Provisional Application No. 60/744,556 filed Apr. 10, 2006, which is incorporated herein by reference.

TECHNICAL FIELD

The present invention relates generally, as indicated, to apparatus and method to detect and to correct for mode hop wavelength error in optical component measurement systems, and, more particularly, to the detecting of mode hop wavelength error of a tunable laser source for testing passive optical components and to correct for such errors to improve the test results and/or characterization of optical components.

BACKGROUND

A tunable laser source (sometimes referred to as TLS) may encounter a mode hop phenomenon (mode hop sometimes is referred to as mode hop wavelength error), whereby as the wavelength of the light (electromagnetic energy) output from the laser is swept over a range of wavelengths, the light may skip from one wavelength to another wavelength rather than relatively smoothly transitioning (or sweeping) over an intended range of wavelengths.

An ideal sweep of a TLS is illustrated in FIG. 1. Referring to FIG. 1, a linear correlation is shown between the beginning wavelength and end wavelength of the TLS as plotted over increasing time. The dotted lines identify ranges wherein the mode hop phenomenon may be detected, i.e., in a region that is displaced or offset from the generally linear correlation between the wavelength of the TLS and time. When the wavelength is greater than the correlated wavelength (e.g., above the linear correlation), such a phenomenon is referred to as a "forward mode hop". Likewise, when the wavelength is less than the correlated wavelength (e.g., below the linear correlation), such a phenomenon is referred to as a "backwards mode hop".

Mode hop may occur in a laser due to mode competition in the laser and represents a shift from one mode of the laser to another; and with such a mode hop shift, a shift in wavelength of the output light from the laser may occur. The mode hop may be in either direction, e.g., increasing or decreasing wavelength. In some lasers the shift in wavelength may occur between about 18 pm (picometers) and about 40 pm; the shift may occur additionally or alternatively between other wavelengths or wavelength ranges—these examples are not intended to be limiting.

The occurrence of mode hop leads to wavelength error in the characterizing of an optical component being tested or measured in an optical component measurement system, for it may be expected that an optical component is being illuminated by incident light of a given wavelength, but the wavelength actually is different from that expected. The mode hop error in the TLS, for example, may be in effect a discontinuity in the sweep of the wavelength of the incident light to the device under test (DUT) and, thus, would cause error in characterizing the DUT. Thus, the occurrence of mode hop can detrimentally affect measurements made by optical measurement instruments and the characterizing of the optical component measured by such instrument.

Optical components are used in telecommunication systems and in other systems. Some examples of optical components include optical fibers, lenses, filters, wavelength division multiplexers, splitters, fiber bragg gratings and other devices. The requirements for accuracy of the wavelength performance of optical components continue to increase, for example, as bandwidth, signal speed, number if signals transmitted, etc., increase. Thus, the performance accuracy of the optical components necessarily increases. Signal loss, polarization dependency, optical interference, and cross-talk between signals are examples of factors that must be reduced as the number of signals, wavelengths, and frequencies increase and extend over wider bandwidths. One approach to increase the number of signals carried in an optical telecommunication system, for example, uses wave division multiplexing (WDM). WDM and other techniques used to increase signal, data, information, etc. transmission or carrying capability, accordingly, increase the wavelength accuracy requirements or characteristics and other optical characteristics required of the optical components used. Correspondingly, there is a need to increase the accuracy and capabilities of optical measurement systems used to characterize or to test such optical components, e.g., to measure or to determine characteristics such as signal loss, wavelength shifts, optical interference, and cross-talk between signals.

Some optical measurement instruments use a tunable electromagnetic energy source, such as, e.g., a TLS, or other device to provide input electromagnetic energy at selected wavelengths or over a range of wavelengths to a device under test (DUT), such as, e.g., an optical component, optical device, optical system, or the like, (these terms, the terms "device under test" or "DUT", etc., may be used equivalently herein) for testing by such instrument. Electromagnetic energy from the DUT can be measured and correlated with the wavelength and/or other characteristics of the incident electromagnetic energy expected from the source. The results of such measurements, correlation, and the like may be used to characterize the DUT. It is desirable that optical measurement systems for characterizing DUT's be accurate.

For brevity of the description herein, the DUT sometimes will be referred to as an optical component, which may be, e.g., an optical fiber, filters, wavelength division multiplexers, splitters, fiber bragg gratings, or other device that is intended for use in an optical system, such as a telecommunication system, or some other optical system or device. For brevity of the description, the electromagnetic energy may be referred to as light, light signal, laser light, laser beam, etc. (regardless of wavelength and regardless of whether in the visible spectrum or in some other wavelength range). The principles of the invention are to be understood as applicable for other DUT's, other electromagnetic energy, other electromagnetic energy sources, etc.

An exemplary way that optical components, such as passive optical components, may be tested is to direct a laser light into the optical component and to take appropriate measurements of light from the output of the optical component. Typically the laser light is provided by a TLS that is swept over a range of wavelengths. The sweeping may be continuous, e.g., as an analog sweep, or may be such as to produce light at a number of discrete wavelengths included in the range. Thus, the wavelength of the laser light changes over a period of time as the test is conducted. The optical characteristics of the optical component may be characterized at a (sometimes large) number of wavelengths.

To test many categories of optical components, especially those typically referred to as passive optical components or containing passive optical components, a light signal is provided at the input(s), and the light exiting the component is measured; the difference between the light at the input(s) and that at the output(s) is used to characterize the performance of the device. In one example of an ideal circumstance, the light signal would be provided as a signal that varies in an exact linear manner between wavelength and time (continuous sweep) or between wavelength and step number (stepped sweep); however, in many instances such ideal circumstance does not occur-one reason for nonlinearity is due to mode hop as is described herein.

To identify correctly the wavelength performance of an optical component, e.g., the performance of the optical component with respect to the wavelength of an incident laser beam from a TLS wavelength as the TLS is swept over a range of wavelengths (whether continuously in an analog fashion or at discrete wavelengths), the wavelength must be known very accurately, particularly at the time that measurements are taken with respect to the optical component. The TLS may be swept over such range once or repetitively, sometimes referred to as periodically or repeatedly swept over such range; and measurements can be taken of the optical component being tested using such TLS. Although the performance of tunable laser sources (TLSs) has been improving, there is an anomalous characteristic to the smooth wavelength change over time performance of tunable lasers, namely, "mode hop", e.g., an instantaneous shift of wavelength, either forward or backward, by some number or amount, as was mentioned above. Occurrence of mode hop can detrimentally affect the accuracy of measurements made by an optical testing system and the characteristics obtained for the optical component being tested. Although efforts have been made to minimize the occurrence of mode hop, it does occur in at least some tunable laser systems. Some more expensive TLSs may be constructed and/or adjusted in an attempt to avoid mode hop over some range of wavelengths, but even these may encounter mode hop as the TLS ages and/or operating conditions, such as temperature and/or humidity, change.

With the above in mind, it would be desirable to be able to detect mode hop and to correct measurement data with respect to the mode hop. This ability may provide a number of advantages, such as, for example, improving the accuracy of the measurements and the characterizing of optical components; the ability to use less expensive laser sources that have mode hop but which still would be suitable for making desired measurements if mode hop wavelength error could be compensated, etc.; and the ability to use a TLS that may be relatively mode hop free over a narrow tuning range, but using the invention such TLS may be able to be used over a wider wavelength range for making measurements.

For background purposes, mode hop detection is generally needed to accurately measure optical power as a function of wavelength. There are different types of measurements that can be taken as a function of wavelength and present day equipment can be very accurate in terms of measuring optical power. In addition to optical power, wavelength is an important parameter to measure in order to allow telecom equipment to advance, e.g., by packing more and more channels into optical fibers. Therefore wavelength separation between channels requires finer and finer precision to accurately characterize devices. Devices may be characterized by a variety of parameters, including: optical power, insertion loss and various other power-related measurements. In addition to these measurements, it is also desired to calculate the above listed parameters as a function of wavelength.

Measurements of these parameters are generally made by using a tunable laser that sweeps across a range of wavelengths. Measurements are taken periodically over the range of wavelengths. An ideal tunable laser will sweep at a fixed rate and, for example, might start at 1525 nanometers in sweep to 1600 nanometers and perform the sweep at a fixed rate of perhaps 100 nanometers per second. This is ideal, but reality is that mechanisms inside the lasers will cause the wavelength to change not at a 100 nanometers per second, but at variable sweep rates during that sweep and that causes inaccuracies in wavelength. As a result, the actual wavelength as a function of time deviates from the ideal wavelength as function of time during that sweep.

To correct this problem various correction schemes have been developed to much more accurately determine wavelength as a function of time during that sweep. However, one of the non-idealities of tunable lasers is that as they sweep, the laser can mode hop. A mode hop changes the mode of the laser and is generally very difficult to correct. A typical mode hop might be approximately in the range of 15-45 picometers (pm). Mode hops affect measurement accuracy because it is generally desired to characterize devices with accuracy as small as one (1) pm. Therefore, mode hops pose a significant problem to obtaining the desired accuracy.

SUMMARY

With the above in mind, then, an aspect of the present invention is to improve accuracy in characterizing a DUT, e.g., an optical component, optical device, optical system or the like.

Another aspect relates to detecting mode hop wavelength errors in optical measurement systems.

Another aspect relates to detecting mode hop wavelength error in a TLS for use in an optical measurement system, for example, so that measurement data can account for the mode hop wavelength error.

Another aspect relates to a method of testing an optical device including directing incident electromagnetic energy at a range of wavelengths to an optical device, detecting electromagnetic energy from the optical device to obtain data characterizing the optical device, and detecting mode hop wavelength error.

Another aspect relates to a method of testing an optical device including directing incident electromagnetic energy at a range of wavelengths to an optical device, detecting electromagnetic energy from the optical device to obtain data characterizing the optical device, detecting mode hop wavelength error in the incident electromagnetic energy, and providing for correcting of data that was skewed due to the mode hop wavelength error.

Another aspect relates to a method of correcting mode hop wavelength error in data obtained measuring optical characteristics at a number of wavelengths, including at a location where mode hop wavelength error occurs or is expected to occur in an assemblage of data representing optical characteristics with respect to wavelength of incident electromagnetic energy of a device under test, shifting data to improve correspondence of the data with the wavelength of the incident electromagnetic energy.

Another aspect relates to apparatus, device or system for characterizing optical components, optical devices, optical systems, or the like, including a source of incident electromagnetic energy capable of providing such electromagnetic energy at a number of wavelengths, the electromagnetic energy being provided to a device under test, a detector for detecting electromagnetic energy from the device under test in coordinated relation to the wavelength of the incident electromagnetic energy, and a corrector to correct for mode hop wavelength error in measured data.

Another aspect relates to a method of correcting mode hop wavelength error in data obtained measuring optical characteristics at a number of wavelengths, including at a location where mode hop wavelength error occurs in an assemblage of data, representing optical characteristics with respect to wavelength of incident electromagnetic energy of a device under test, and shifting data to improve correspondence of the data with the wavelength of the incident electromagnetic energy.

Another aspect relates to a method of testing optical device, including directing incident electromagnetic energy at a range of wavelengths to an optical device, detecting electromagnetic energy from the optical device to obtain data for characterizing the optical device, and correcting the data for mode hop wavelength error.

Another aspect relates to a system for testing an optical device, including a tunable laser source for directing incident electromagnetic energy over a range of wavelengths to an associated device under test, a detector for detecting a mode hop wavelength error, a storage device communicatively coupled to the detector for storing data representative of one or more optical characteristics associated with wavelength of the incident electromagnetic energy applied to the associated device under test, and a processor communicatively coupled to the storage device, wherein the processor executes an algorithm for correcting a mode hop wavelength error detected in the data.

A number of features are described herein with respect to embodiments of the invention; it will be appreciated that features described with respect to a given embodiment also may be employed in connection with other embodiments.

The invention comprises the features described herein, including the description, the annexed drawings, and, if appended, the claims, which set forth in detail certain illustrative embodiments. These embodiments are indicative, however, of but a few of the various ways in which the principles of the invention may be employed.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims appended hereto.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIGS. 16-20 are exemplary graphical representations of various aspects of the present invention.

DESCRIPTION

Figure 1:
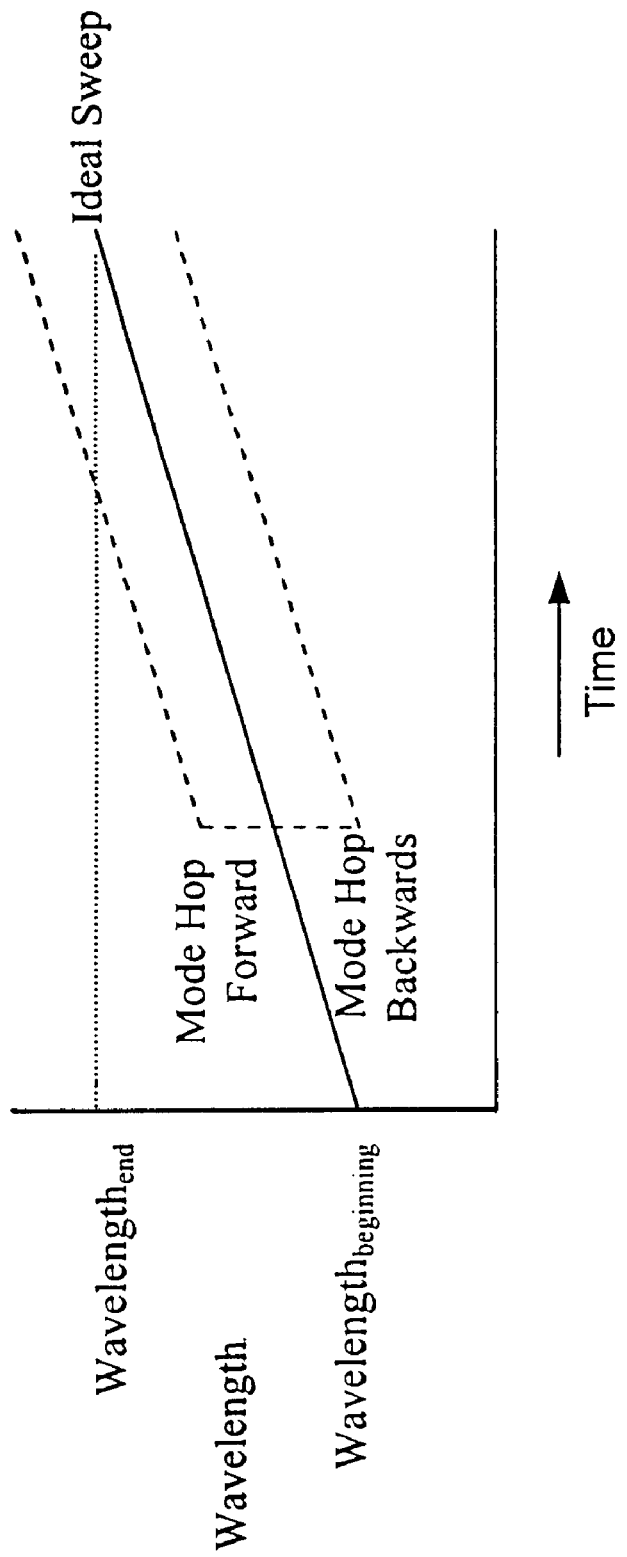
FIG. 1 is an exemplary graph illustrating an ideal sweep of a tunable laser source as a function of wavelength versus time.
Figure 2:
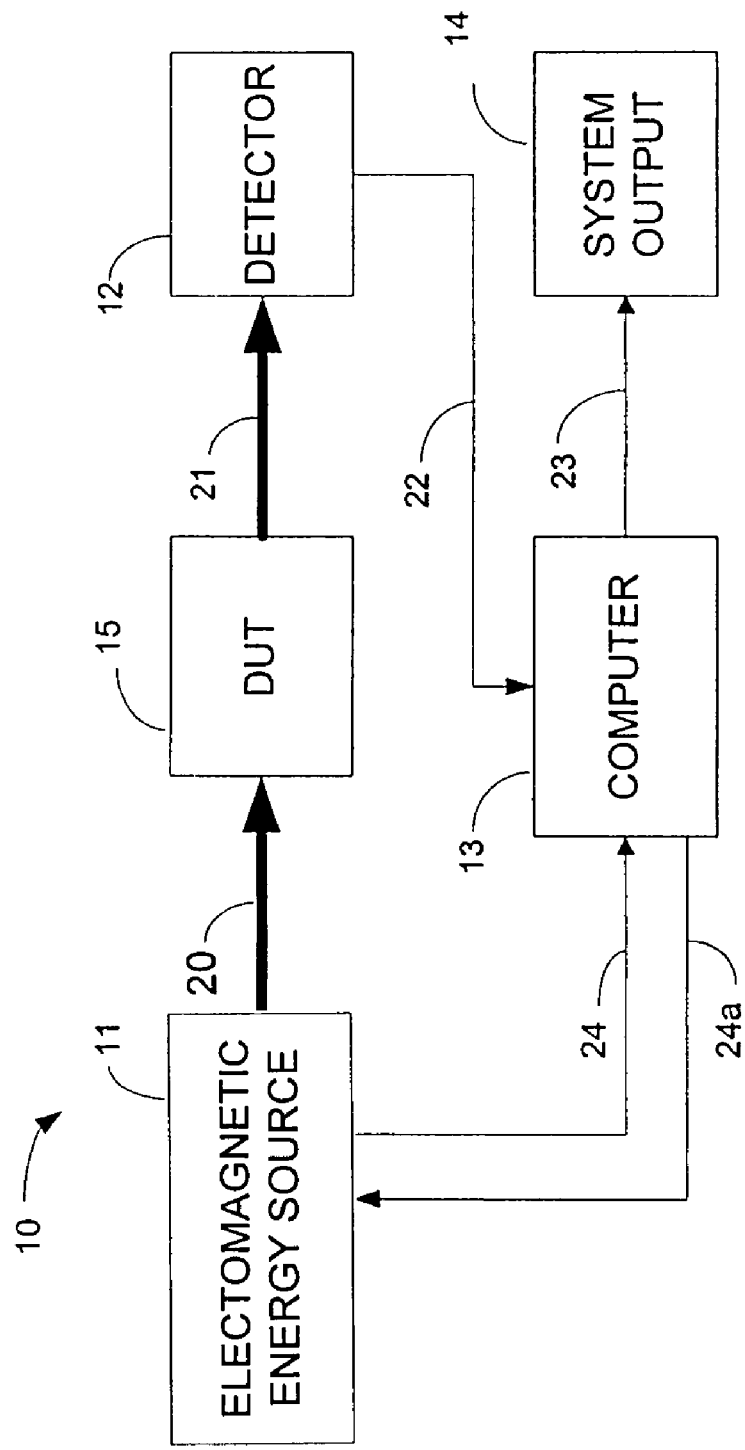
FIG. 2 is a schematic illustration of an optical testing system in which the present invention is embodied.

Referring, now, to the drawings, wherein like reference numerals designate like parts in the several figures, and initially to FIG. 2, an optical testing system 10 (also referred to as optical measurement system) is illustrated. The optical testing system 10 includes an electromagnetic energy source 11, a detector 12, a computer 13 and a system output 14. A device under test (DUT) 15 is placed in the optical testing system 10, and in operation of the optical testing system the DUT 15 may be characterized. In characterizing the DUT 15 incident electromagnetic energy 20 is provided to the DUT 15, and output electromagnetic energy 21 from the DUT 15 is detected by the detector 12 and may be used to obtain characteristics of the DUT 15, as will be described further below.

Mode hop wavelength error (also referred to as a mode hop) may occur in the optical measurement system 10. Mode hop may occur during operation of the electromagnetic energy source 11, for example. As is described in greater detail below, the present invention provides for detecting mode hop. If the mode hop is detected, corrections, adjustments, etc., in the data for characterizing the DUT 15 can be made to account for the mode hop error. This capability to detect mode hop error and to accommodate errors in the measurement data allows the possibility to use in the measurement system 10 less expensive electromagnetic energy sources that may have mode hop error, rather than more expensive sources that usually are less likely to have mode hop error. Moreover, in the past some optical measurement systems did not use the full range of wavelengths capability of an electromagnetic energy source because at one or more locations in the spectrum wavelengths produced thereby, there may be mode hop. Therefore, to allow use of such sources the range of wavelengths provided was restricted to a range at which a mode hop did not occur.

The electromagnetic energy source 11 provides electromagnetic energy over a range of wavelengths. The range may be a continuous range, for example, as in an analog signal that changes continuously from one wavelength to another without discrete steps in between the wavelengths. Alternatively or additionally, the range may include a number of distinct wavelengths that are between respective wavelength values at respective opposite ends of the range. The wavelength range may be the visible range of wavelengths or part of the visible range, may be in the ultraviolet, infrared, or some other range, or may be a combination or part or all of the mentioned and/or other ranges. The range may be continuous or may include discontinuous portions. An exemplary wavelength range is from about 1502 nm to about 1604 nm. One of ordinary skill in the art will readily appreciate that the invention may be used with other wavelengths and wavelength ranges.

To detect occurrence of mode hop wavelength error, the measurement system 10 is used to measure insertion loss with respect to wavelength of an optical component that generates a repeating optical signal as incident light that is swept over a range of wavelengths is directed to the optical component and the insertion loss is measured. Thus, the optical component in effect converts an apparent wavelength shift into a power magnitude shift that can be easily measured by conventional power measurement techniques to detect occurrence of mode hop wavelength error of the incident light source, for example.

Another approach to detect occurrence of mode hop wavelength error may use comparison of graphs, as is described below. Once the fact that mode hop wavelength error exists for the electromagnetic energy source, and the direction and magnitude of that error are known, appropriate compensation therefore in the data taken as a representation of insertion losses with respect to wavelength may be carried out, as is described further below.

An example of such an electromagnetic energy source 11 is a tunable laser source (herein below sometimes referred to as "TLS"), and the invention will be described below with respect to a TLS that provides a laser beam (sometimes referred to as light but may be other electromagnetic energy) 20 as incident electromagnetic energy to the DUT 15. It will be appreciated that other types of electromagnetic sources may be used and fall within the spirit and scope of the present invention. For convenience and brevity the electromagnetic energy from the electromagnetic energy source will be referred to as laser beam 20 or simply as light or light beam. The sweep of the TLS may be very fast, thus allowing the measurement system 10 to fully examine the power spectrum of light from a DUT in a time frame that is in the second to millisecond (ms) range.

The term "swept", as used herein, means that the TLS 11 provides its light output at a number of wavelengths over a range of wavelengths. That the wavelengths are "over" a range or "in" a range does not require that all wavelengths are used in the range, although use of all may be possible, for example, if the optical testing system 10 can use, e.g., produce and detect, all wavelengths in the range. A TLS 11 may have a sweep cycle; it may have periodic operation whereby the light output periodically and repeatedly is produced as light 20 that is swept over such range.

The light 20 from the TLS 11 is incident on the DUT 15, and light 21 from the DUT, e.g., transmitted or reflected thereby, is sensed or detected by the detector 12 to provide an output signal on line 22 that is representative of the sensed or detected light 21. The signal on line 22 may be provided the computer 13 (or to another computer or computational device), and/or to an amplification or other signal conditioning circuit (not shown); and the resulting amplified, conditioned or otherwise adjusted signal on line 23 is provided via the system output 14. The system output 14 may include the mentioned and/or other amplification, signal conditioning, computational, control, etc. circuitry or may include other circuitry for the purpose of obtaining useful system output information and/or signal for characterizing the DUT 15.

In an exemplary optical testing system 10, the computer 13 coordinates operation of the TLS 11 with the signal on line 23 to the system output 14. Therefore, as the TLS moves, scans, sweeps, etc. through the wavelengths of light it produces, the system output information is representative of characteristics of the DUT 15 as the DUT receives incident light 20 at respective wavelengths. As one example, such coordination between the TLS 11 operation and the detector 12 output signal on line 22 may be achieved by a signal from the TLS provided on line 24 to the computer 13 so the computer is "aware" of the wavelength or other characteristic of the light produced by the TLS. As another example, the computer 13 may provide a control signal on line 24a to the TLS to "direct" or to instruct the TLS to produce a given light output. Coordination between the TLS 11 and computer 13 also may be based on time, whereby a timing signal may be used to indicate that the TLS is starting (or is elsewhere in) its scan cycle or period; and based on what are supposed to be known characteristics of the TLS, the wavelength of its output at subsequent times would be expected. Other possibilities for such coordination also are possible.

To detect occurrence of mode hop, a reference optical component that has at least generally known characteristics is used as the DUT 15 in the measurement system 10. An example of such a reference optical component may be an etalon or some other similar or equivalent device. Other reference optical components also may be used; the following description, though, is directed to using an etalon. An etalon is a periodic optical filter; it can be formed, for example, as an optical cavity of two partially reflecting mirrors separated by a fixed optical path; the cavity transmits light of a wavelength where there is constructive interference at the mirror surfaces. Transmission maxima occur periodically at different wavelengths. The wavelength range between maxima is defined as the free spectral range (FSR), and the spectral width of a peak (FWHM) is defined as the instrumental bandwidth. The ratio of the FSR to the instrumental bandwidth is the finesse of the etalon. Thus, finesse characterizes or describes the shape of a signal, for example a periodically varying signal. For example, a periodic signal that has a shape that is somewhat spike-like or "spikey", in that it has portions that rise quickly to a relatively sharp peak and fall relatively quickly to a relatively flat bottom may be referred to as having a high finesse.

Figure 3:
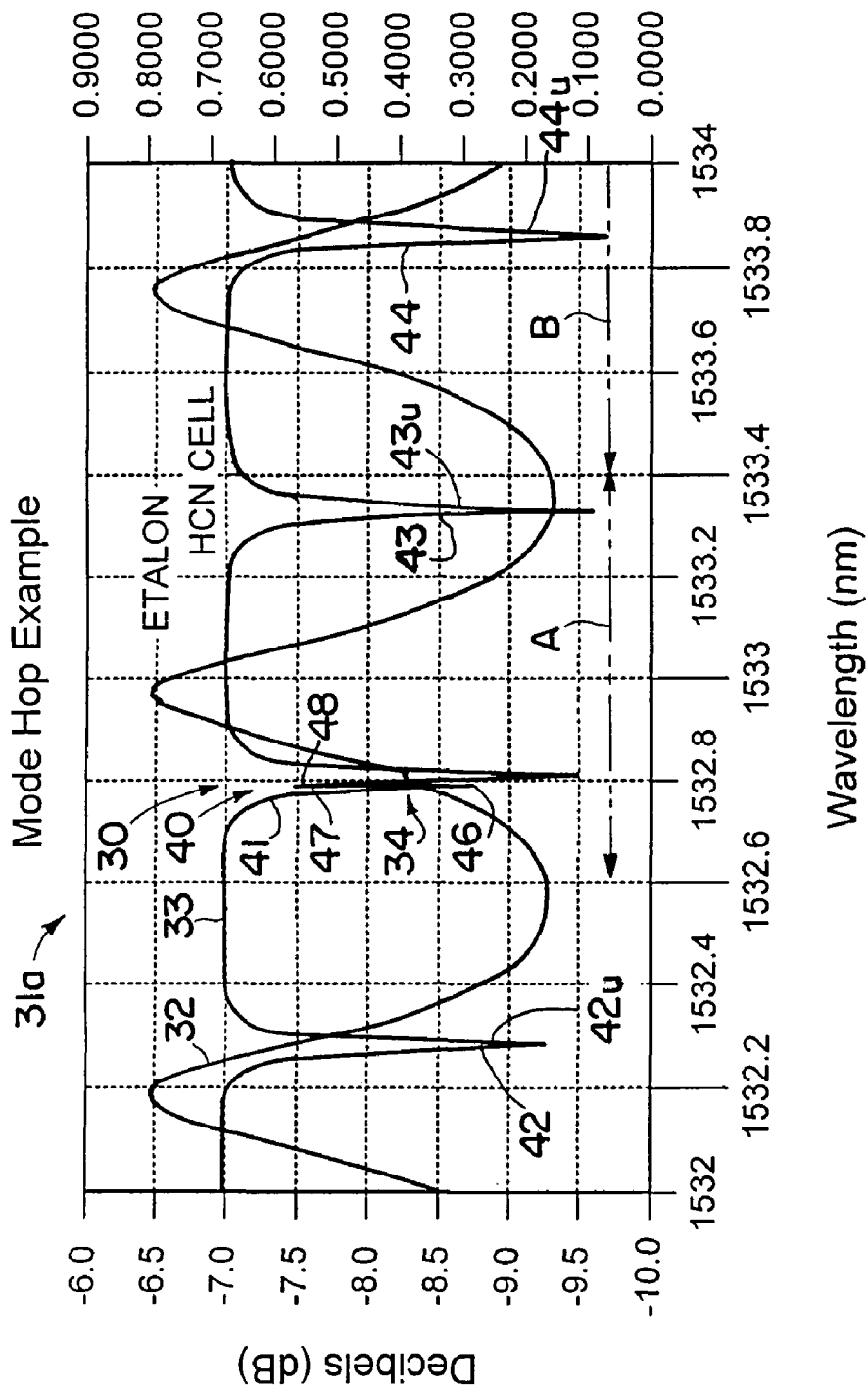
FIG. 3 is a graph illustrating an example of the occurrence mode hop wavelength error.
Figure 4:
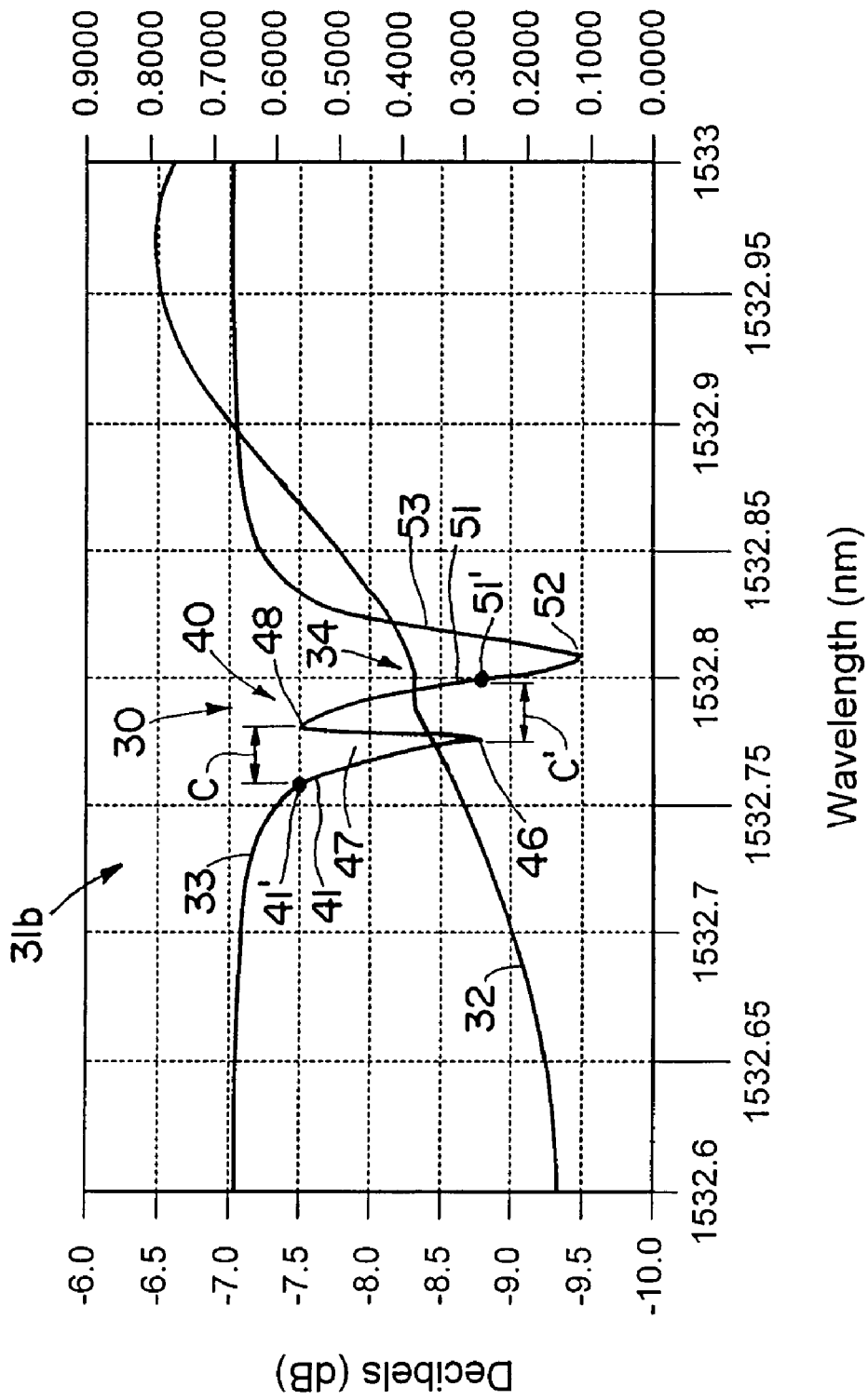
FIG. 4 is an enlarged view of a portion of the graph of FIG. 3.

To demonstrate operation of the invention to detect mode hop so that compensation for data that may be skewed or incorrect due to the mode hop, reference is made now to FIGS. 3 and 4. Using a measurement system 10 to measure light from an etalon and from a gas cell containing hydrogen cyanide gas (HCN), several curves of measured signals were plotted. At least portions of graphs of data or curves illustrating those measurements and, thus, the plots are illustrated in FIGS. 3 and 4 to demonstrate the occurrence of mode hop, which is shown at 30. The curves and graphs thereof are exemplary only and are used here to describe an example of the invention. Other optical components and/or materials may be tested using the measurement system 10 to detect mode hop so compensation can be provided and to characterize optical components.

Mode hop occurrence is exemplified at 30 in FIGS. 3 and 4 in which two graphs 31a, 31b are illustrated. Each graph 31a, 31b has curves 32, 33 drawn therein, which represent measurement data of light intensity or power along the vertical or Y-axis measured at respective wavelengths from the TLS 11 shown on the horizontal or X-axis. Thus, the curves 32, 33 represent a power spectrum, e.g., insertion loss vs. wavelength for the current DUT. The curves 32, 33 were prepared from data taken using the measurement system 10 to take measurements to obtain a power spectrum for a reference, such as an Etalon or a hydrogen cyanide gas cell. An analysis of that power spectrum shows an anomaly at approximately 1532.775 nm (nanometers), which is indicative of mode hop occurrence, as is described further below. Once mode hop wavelength error has been detected and compensation provided for what may otherwise be errors in measured data, the measurement instrument 10 may be used to determine insertion losses for other optical components and, thus, characterize such optical components.

Curve 32 represents intensity (power spectrum) of light from a 100 GHz (gigahertz) etalon measured in the measurement system 10, and curve 33 represents intensity (power spectrum) of light from the mentioned hydrogen cyanide gas cell DUT using the measurement system 10 of FIG. 2. In the graph 31b of FIG. 4 the wavelength scale (X-axis) has an enlarged or expanded scale, relative to the scale of the graph 31a of FIG. 3, to illustrate details of the mode hop 30 region of the curves 32 and 33.

In the graphs 31a, 31b the vertical or Y-axes are calibrated or scaled in intensity, e.g., in decibels (db) or in some other units representing light intensity or relative light intensity. The horizontal or Y-axes are calibrated or scaled in wavelength, e.g., from 1532 nm (nanometers) through 1534 nm in 0.2 nm increments for graph 31a and from 1532.6 through 1533 nm in 0.05 nm increments for graph 31b. The wavelengths in the horizontal scales of graphs 31a, 31b are based on time in the sweep cycle of the TLS 11 and, therefore, represent the expected wavelength of the TLS laser beam 20 at respective times into a given sweep cycle. Accordingly, the actual scale of the horizontal axes is based on time, although the expected wavelength of the laser beam 20 of the TLS 11 is written at the respective points in time when those wavelengths are expected to be produced by the TLS, which facilitates coordination with the measurements made by the detector 12, the computations by the computer 13, and ultimately the result provided by the system output 14. Also, it may be difficult to obtain accurate measurements of the wavelength of the light actually provided by the TLS at a given moment in time; and, therefore, using the time to wavelength relationship is a reasonable technique in the art.

The wavelength of the laser beam 20 may or may not change uniformly, e.g., proportionally, with respect to time in a give sweep cycle. If the wavelength does not change uniformly (proportionally) with time, then various techniques may be used to relate the time and wavelength, as by computation, use of look up tables or other techniques.

As is seen at 30 in the curves 32, 33, of FIGS. 3 and 4, mode hop occurs in the time or wavelength region of 1532.775 nm. Referring to FIG. 4 showing the enlarged graph 31b of the curves 32 and 33, in the curve 32 there is an anomaly or aberration at 34 where the otherwise smooth curve 32 has a stepped part that does not otherwise follow the smooth curve shape. Referring to FIG. 3, that anomaly is seen in the rising part of the curve 32 at the cycle A of the curve 32 that begins at about 1532.6 nm and ends at about 1533.4 nm. No anomaly is shown in the rising part of the curve 32 at the next cycle B, which begins at about 1533.4 nm.

The anomaly 34 provides an indication that mode hop has occurred. It may be difficult to determine that mode hop has occurred if the anomaly 34 is relatively small or slight. However, by taking a derivative of the curve 32, e.g., the first derivative, the anomaly 34 appears more evident, thereby indicating occurrence of mode hop at the frequency of the TLS light output at which the anomaly occurs.

The effect of mode hop on measurements made of the HCN gas cell (DUT) described above is seen at the curve portion 40 of curve 33. The mode hop occurrence is more pronounced in curve 33 than in curve 32. Curve 33 decreases in intensity at the down leg portion 41. Referring to FIG. 3, the down leg portion 41 may be expected to follow the same path as down leg portions 42, 43 and 44 of other cycles of the curve 33 to a level of about −9.5 db. However, in the area 30 where mode hop occurs, the down leg curve portion 41 stops at point 46 and nearly instantaneously rises along up leg curve portion 47 to point 48.

In FIG. 4, the point 46 where mode hop is shown to be occurring, the wavelength of the light from the TLS 11 is at approximately 1532.775 nm. At that point along the curve 33 the power or intensity of the light jumps along curve portion 47 from about −8.75 db to about −7.5 db, which is reached at a point or location designated 48. From point 48, the curve 33 follows another down leg 51 to location 52 where the next up leg 53 commences. Location 52 is at about the same power or intensity as is reached by the respective down legs 42, 43, 44, namely, about −9.5 db. Also, as is seen in FIG. 4, the shape of the down leg 51 is the same or nearly the same as the shape of the down leg 41 and also of the down legs 42, 43, 44. The shape of the up leg 53 is the same or nearly the same as the up legs 42u, 43u, 44u, which are designated in the graph 31a of FIG. 3.

From the foregoing, it will be appreciated that the mode hop effectively shifts the curve 33 in the mode hop area 40 an amount equal to the illustrated distance C, which is shown in FIG. 4. The distance C represents the time duration in the sweep cycle of the TLS 11 between (i) the point 48 in the curve 33 when the down leg 51 commences after the nearly instantaneous jump leg 47 concludes, e.g., reaches its apex and (ii) the corresponding point 41' in the down leg 41 prior to the occurrence of mode hop. The corresponding point 41' is that point along the curve 33 at which the intensity or power that is measured is the same as the intensity or power at point 48. Alternatively, the distance C' shown in FIG. 4 can be determined as the distance between the point 46 at the bottom of the down leg 41 where the mode hop begins and the point 51' where the down leg 51 reaches the magnitude of the point 46. The distance C (or C') represents both time in the course of the sweep of the TLS 11 to provide a light output at the respective wavelengths at the opposite ends of the mode hop duration or magnitude.

If the mode hop is in one direction, the result will lead to the repeating of data points representing a portion of the power spectrum for a given DUT. If the mode hop is in the opposite direction, then some data points will be omitted. Thus, as the TLS 11 provides light over a range of wavelengths that are swept or changed over a period of time, a jump in wavelength backward results in retracing a portion of the measurements by the measurement system 10; and a jump forward results in a gap whereby some wavelength data, e.g., data points representing wavelength and insertion loss/light intensity or power measured for such lost data points, would not be obtained. However, according to the invention the occurrence of a mode hop wavelength error can be detected; and once the mode hop wavelength error and the size and direction of it are known, compensation can be provided for the data. For example, the data may be adjusted or the data may be dropped, as it is known to be somewhat inaccurate.

As is illustrated in the drawings of FIGS. 3 and 4, the shapes of curve portions 41, 51 are substantially the same. In a sense curve portion 51 and the rest of curve 33 following curve portion 51 in time could be moved to the left in the graph 31b, and part of curve portion 51 could be superimposed directly onto curve portion 41—the curve shapes tend to match. This curve match indicates that although mode hop occurs, by compensating for the mode hop, subsequent operation of the TLS 11 and the optical testing system 10 in the subsequent portion of a given sweep cycle could provide accurate measurements and the ability accurately to characterize a DUT 15.

Figure 5:
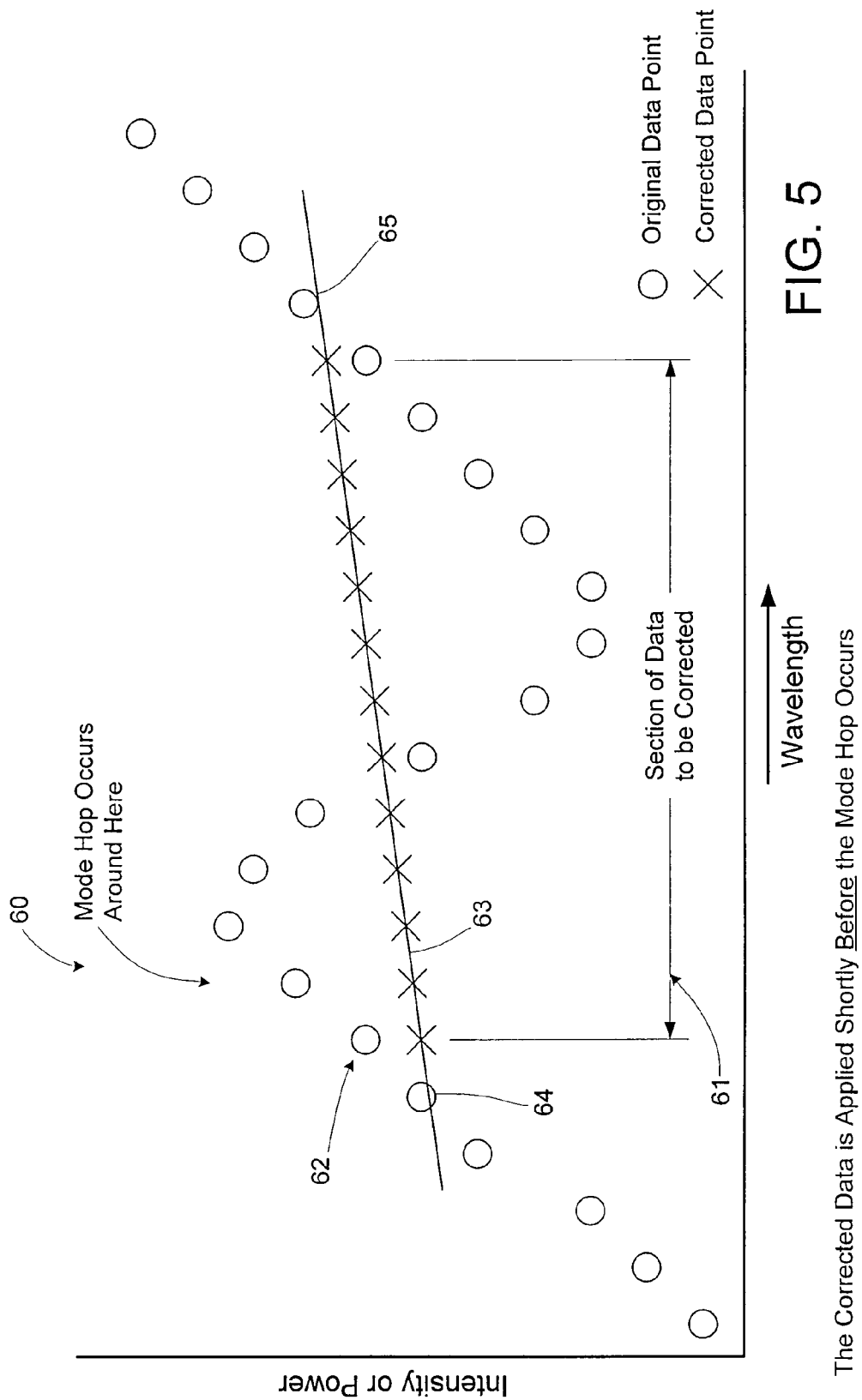
FIG. 5 is a graph illustrating exemplary data points taken prior to, at and just after occurrence of a mode hop wavelength error and corrected data.

Turning to FIG. 5, a graph 60 is illustrated. The graph 60 contains a number of data points representing measurements of light intensity or power of a DUT as measured in the measurement system 10 over a number of wavelengths from just prior to until just after the occurrence of mode hop in the TLS, for example, of the measurement system. The duration of the mode hop may be represented by the section of data designated 61 in FIG. 5. The graph 60 is similar to the graphs 31*a*, 31*b* of FIGS. 3 and 4, although the graph 60 represents data from an "unknown" or a non-reference optical component as the DUT is measured by the measurement system 10 to characterize such DUT. Thus, the orthogonal axes of the graph 60 of FIG. 5 represent intensity or power vs. wavelength (or time).

The o's (circles) in FIG. 5 represent originally measured data; the x's represent the data after correction. There are twenty two (22) o's, and they collectively outline the shape of a curve 62 that represents, based on slope of the curve, increases in intensity, then relatively abruptly decreases in intensity approximately at the section where the mode hop occurs, and continues with decreased intensity until another reversal, and lastly increases in intensity as the section 61 is passed. The intensity magnitude is represented by the vertical or Y axis or direction in FIG. 5, and the wavelength is represented by the horizontal direction or X axis in a manner similar to FIGS. 3 and 4. Counting from the left in the figure, the sixth ($6^{th}$) through the eighteenth ($18^{th}$) o's represent data in the section 61 of the curve 62 in the graph 60 that is to be corrected. The mode hop that was determined using an etalon or a hydrogen cyanide gas cell in the measurement system 10, as was described above.

One way to correct the data shown in the graph 60 is to draw a straight line 63 from a data point just prior to the section 61, e.g., just prior to occurrence of the mode hop—such data point being designated 64—to the data point immediately following the last data point in the section 61—such data point being designated 65. That line 63 is shown in FIG. 5 as including there along a number of x's at the respective wavelengths where corresponding o's data points had been measured—such measurement being an incorrect measurement due to the mode hop. Using this approach, the DUT that would be characterized using the measurement system 10 would have a curve represented by the first five and last five data points in FIG. 5, plus those data points preceding and following such first and last five, plus those "x" data points lying along the line 63, as is illustrated in FIG. 5. Although the data points on the line 63 are not accurately representative of correct data points, they are a reasonable representation to provide data that would be expected to be encountered if properly measured by the measurement system 10 that did not have mode hop wavelength error.

A second way to correct the data composing the curve 62 shown in FIG. 5 would be to discard the data in the section 61. A problem with this approach is the gap between the portions of useful and accurate data for specified wavelengths represented by the section 61.

A third way to correct the data composing the curve 62 in the area of the section 61 is to connect the data points using some other functions, such as using a sum of least squares fit, etc. As part of this approach or the first approach to correct the data, curve matching algorithms or simply viewing of the curves shown in FIGS. 3 and 4 could be used to determine the separation of the two down legs on opposite sides of the mode hop, as was described above. Also, if desired various lookup tables could be prepared and stored for use in determining appropriate corrections to be made to the data, depending on the size, direct, and/or other parameters associated with the mode hop occurrence.

In the illustrated example the curve 32 represents light transmission through an Etalon cell, which is a narrow band optical filter, e.g., a 100 GHz (gigahertz) and the curve 33 represents light transmission through a hydrogen cyanide cell. These are to be understood as examples only; however, as will be appreciated by those having ordinary skill in the art, the invention may be used in connection with other optical testing systems and in connection with measurement of light transmitted in or reflected from other optical components, devices, materials, etc. The curves 32, 33 may be obtained by placing a respective sample (DUT) in the optical test system 10 or other optical test system and taking measurements of light from the DUT as the wavelength of the TLS 11 is swept.

The mode hop effect, as is shown at 30 in FIGS. 3 and 4, occurs as the TLS 11 provides light incident on the two samples (DUTs), light intensity is measured, and the curves 32, 33 are obtained. The TLS 11 of the illustrated example relatively smoothly changes wavelength of the laser beam it provides, e.g., as an analog function, whereby over a period of time the wavelength of the light 20 is swept relatively smoothly over a range of wavelengths rather than in discrete wavelength steps. As stated above, the invention may operate the in the same or similar manner to that described herein in the case of the TLS 11 sweeping its output laser beam in discrete wavelength steps. The curves 32, 33 generally follow respective smooth patterns demonstrating measurements of light intensity from the respective samples as the wavelength of light from the TLS is swept over the illustrated range of wavelengths; the curves 32, 33 may repeat as the TLS 11 provides light that repeatedly is swept over a given wavelength range.

The mode hop 30 shows in the curves 32, 33 as an anomaly or aberration 35, 36 in the otherwise generally smooth patterns of the curves 32, 33 between approximately the illustrated wavelengths 1532.75 nm and 1532.85 nm due to mode hop in the TLS 11. In the illustrated example of FIGS. 3 and 4 the mode hop results in the wavelength of the TLS 11 "hopping" or jumping back to a wavelength and then continuing generally smoothly through the wavelength sweep to the end of the swept wavelength range. Thus, for example, looking at graphs 31*a*, 31*b* the TLS 11 may provide light that generally smoothly changes wavelength from about 1532 nm to about 1532.775 nm; but when the mode hop occurs at 30, the wavelength jumps back and then continues on its normal course as shown in the graphs 31*a*, 31*b* to the right of where the mode hop has occurred, e.g., to the right of the point 44 or start of curve portion 42.

The detector 12 may be a photosensitive, light sensitive, etc. device capable of sensing electromagnetic energy 21 from the DUT 15, e.g., to produce an electrical output signal or information at the detector output 22 representative of the detected electromagnetic energy. An example of a detector is a light sensitive diode (sometimes referred to as a photodiode). Various circuitry (not shown) may be used to amplify the output signal from the detector 12 and/or otherwise to condition, to affect, etc., the detector output signal. Such circuitry may be part of the detector and/or may be separate. Optical components and/or systems also may be associated with the detector 12; examples include lenses, reflectors, polarization devices, integrating spheres, diffusers, and/or others to condition, to affect, etc. the optical signal in the system 10 and/or incident on the detector 12. Such components and/or systems may be part of the detector and/or may be separate.

The computer 13 may be a central processing unit (CPU) and one or more associated peripheral devices, such as memory, display, mouse, data input device (e.g., keyboard), and one or more other peripheral and/or internal devices, systems, circuits or the like. The computer 13 may be coupled to the TLS 11 to control, at least in part, the wavelength sweeping function of the TLS, whereby the wavelength of the laser beam 20 is determined by an electrical signal on line 23 from the computer 13 to the TLS 11. In an alternative example or embodiment, the wavelength sweeping operation of the TLS 11 may be controlled or effected by the TLS itself without a control input from the computer 13; and in this case a signal may be provided on line 23 to the computer 13 for synchronization or coordination with the wavelength sweeping function. In either case, the computer 13 is able to coordinate the signal it receives at detector output 22 from the detector 12 with respect to the wavelength of the incident laser beam 20 from the TLS 11, and the coordinated information or data then is provided by the computer 13 to the system output 14 of the optical testing system 10.

In operation of the optical testing system 10, a DUT 15 is placed in the system. The TLS 11 provides an incident laser beam 20 to the DUT 15. The incident laser beam is swept over a range of wavelengths. The detector 12 detects the laser beam from the DUT 15. The computer 13 coordinates the measurement data from the detector with respect to the respective wavelengths of the incident laser beam 20 and provides at the system output 14 data useful to characterize the DUT 15, such as signal loss, wavelength shifts, cross-talk, and like characteristics that occur as the laser beam is transmitted in and/or is reflected by the DUT. The measurement system 10 may use as a DUT 15 an etalon or some other device that provides a periodic signal function to occur as light therefrom is detected in response to a swept wavelength incident light directed to the DUT; such etalon or other device may be used in the measurement system 10 to detect whether there is a mode hop circumstance with the TLS 11 or other illuminating source of electromagnetic energy. If there is mode hop wavelength error, then an approach may be selected to correct measurement data, e.g., the power spectrum with respect to wavelength of the etalon and the same correction may be used to correct the data for another DUT that is intended to be characterized by the measurement system 10.

Figure 6:
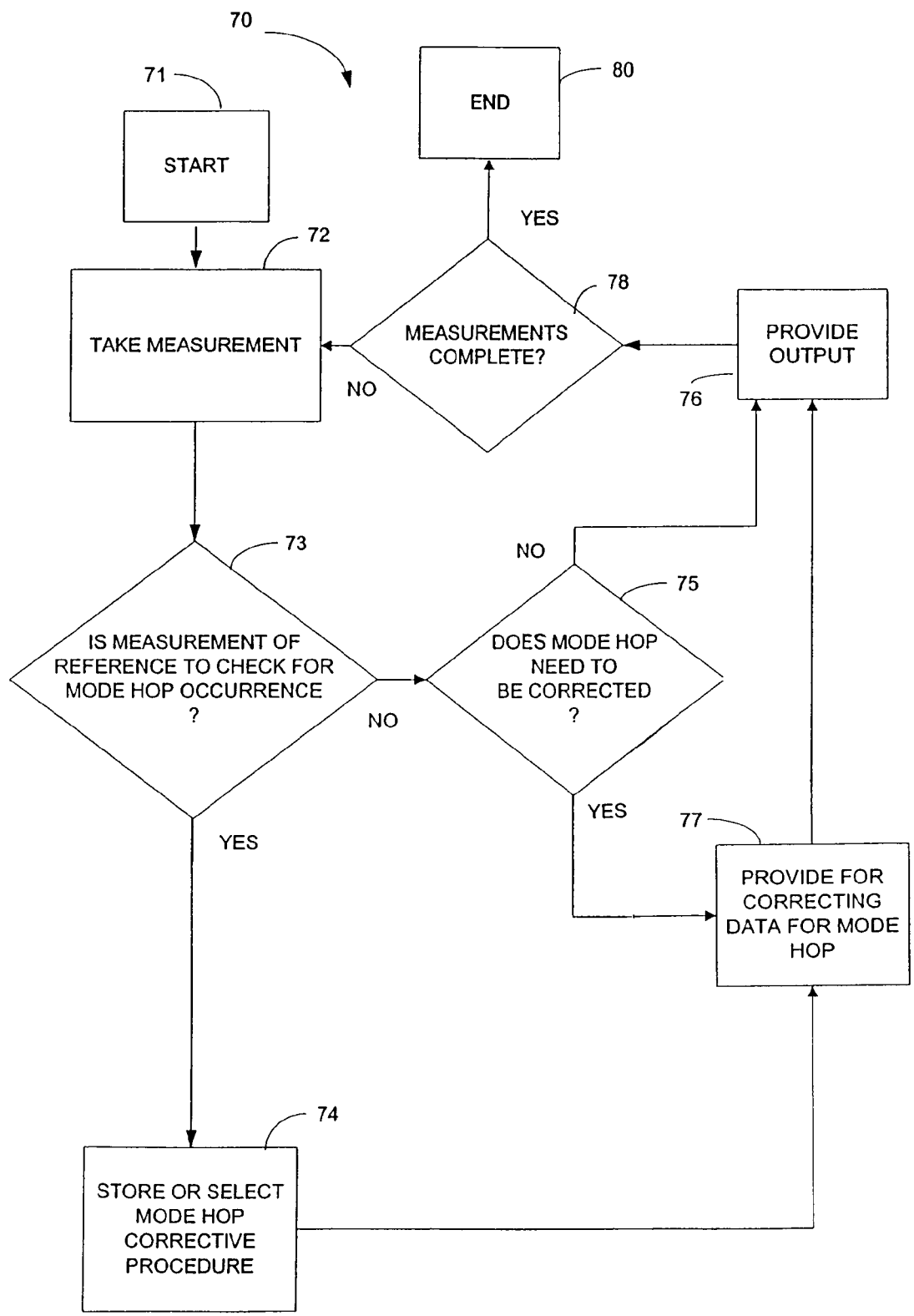
FIG. 6 is a flow chart of a method and computer software program for carrying out the invention.

FIG. 6 illustrates a method 70 of carrying out the invention. The steps shown in FIG. 6 may be carried out using computer software and a processor. The steps may also be carried out using manual control. Other approaches also may be used to carry out the steps of FIG. 6.

At block 71 of the method 70 the processor routine starts. At block 72 a measurement is taken of a DUT 15 using, for example, the measurement system 10. At block 73 an inquiry is made whether the measurement is with respect to a reference, such as, for example, an etalon or a hydrogen cyanide gas cell or some other device that provides for a periodic signal, as was described above. If yes, then at block 74 appropriate steps are taken to prepare for correcting data, as was described above, for example; and if no, then another inquiry is made at block 75 whether mode hop wavelength error needs to be corrected.

If at block 75 mode hop wavelength error does not need to be corrected, then at block 76 an output is provided for use to characterize an optical component, for example. If at block 75 it is determined that mode hop wavelength error does need to be corrected, then at block 77 correction is effected based on the approach stored and/or selected at block 74. From block 77 the routine proceeds to block 76 to provide output to characterize the optical component being measured by the measurement system 10.

At block 78 an inquiry is made whether all measurements have been completed. If not, then the routine 70 proceeds to block 72 and commences further measurement(s) as was just described. If at block 78 all measurements have been completed, e.g., the optical component has been suitably characterized, then the routine 70 ends at block 80.

The present invention accurately measures wavelength, detects mod hops and then corrects the data in a post-processing fashion. When a mode hop has occurred, one aspect of the invention determines where it occurs. It can be determined how big the mode hop was and the data can be corrected so that what the end user ends up seeing accurate data.

The following disclosure supplements the description provided above. The invention generally comprises hardware and software to accomplish the desired functionality. Although the following description is described in terms of hardware and software, one of ordinary skill in the art will readily appreciate that functions implemented in hardware may also be implemented in software and functions implemented in software also may be implemented in hardware.

Figure 7:
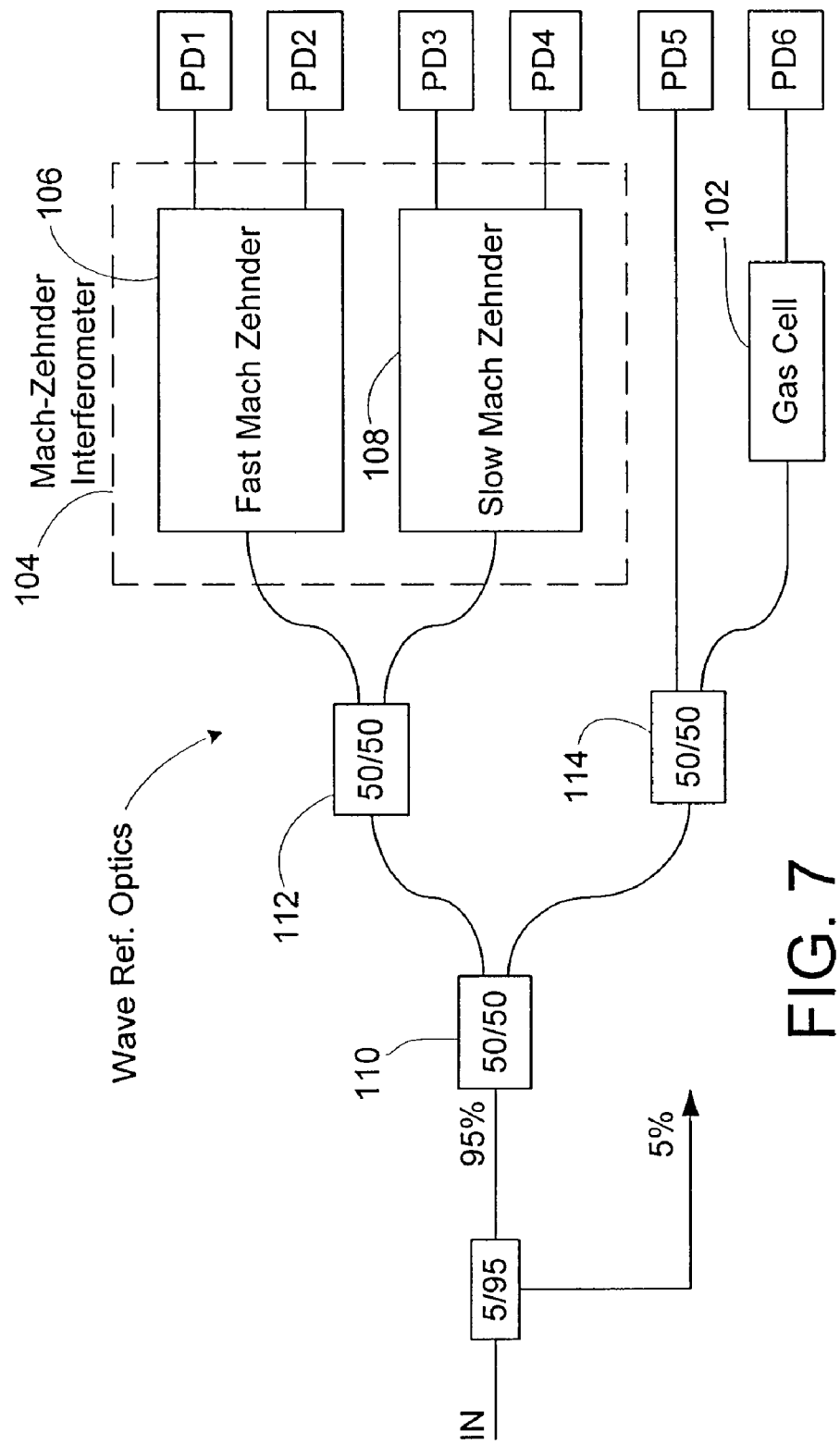
FIG. 7 is an exemplary illustration of optical signal paths in the wave reference optics detector in accordance with aspects of the present invention.

Hardware:

In one embodiment, a portion of the optical signal that comes from the TLS 11 may be tapped off (e.g., 5%) and all or a portion of the remaining signal may be input to a wavelength reference device 100, wherein the optical signal gets split up into one or more paths, as illustrated in FIG. 7. One path will generally go into a gas cell 102. The gas cell 102 is a device that is filled with a particular kind of gas. Exemplary gases include hydrogen cyanide, acetylene, carbon monoxide or other combinations. Each gas will generally have unique absorption lines.

Figure 8:
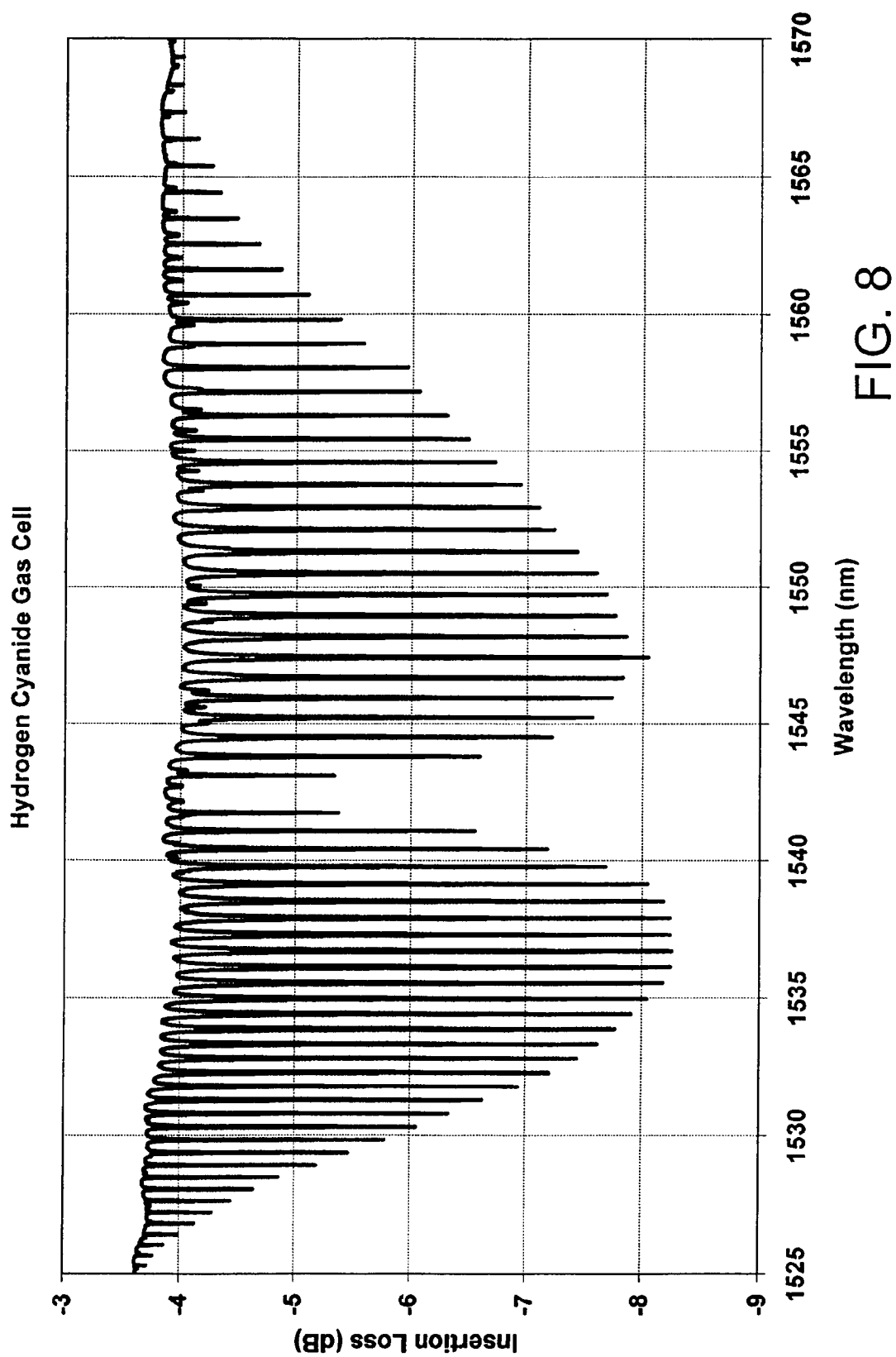
FIG. 8 is a graphical representation of insertion loss versus wavelength for an exemplary Hydrogen Cyanide Gas Cell in accordance with various aspects of the present invention.

For example, referring to FIG. 8, there are absorption lines roughly from 1525 to 1565 nanometers for a gas cell 102 filled with hydrogen cyanide. The absorption line is a fundamental property of the gas and does need to be calibrated. Accordingly, the absorption lines provide an absolute determination of wavelength. As the gas cell 102 is swept, software can determine which line corresponds with which wavelength, which provides an absolute accuracy for the wavelength determination. But the gas cell only provides finite information. For example, hydrogen cyanide has fifty-one lines of known wavelength, so the one aspect of the present invention is to interpolate for the wavelengths at every single measurement point, not just at fifty-one points measured across the wavelength spectrum.

Figure 9:
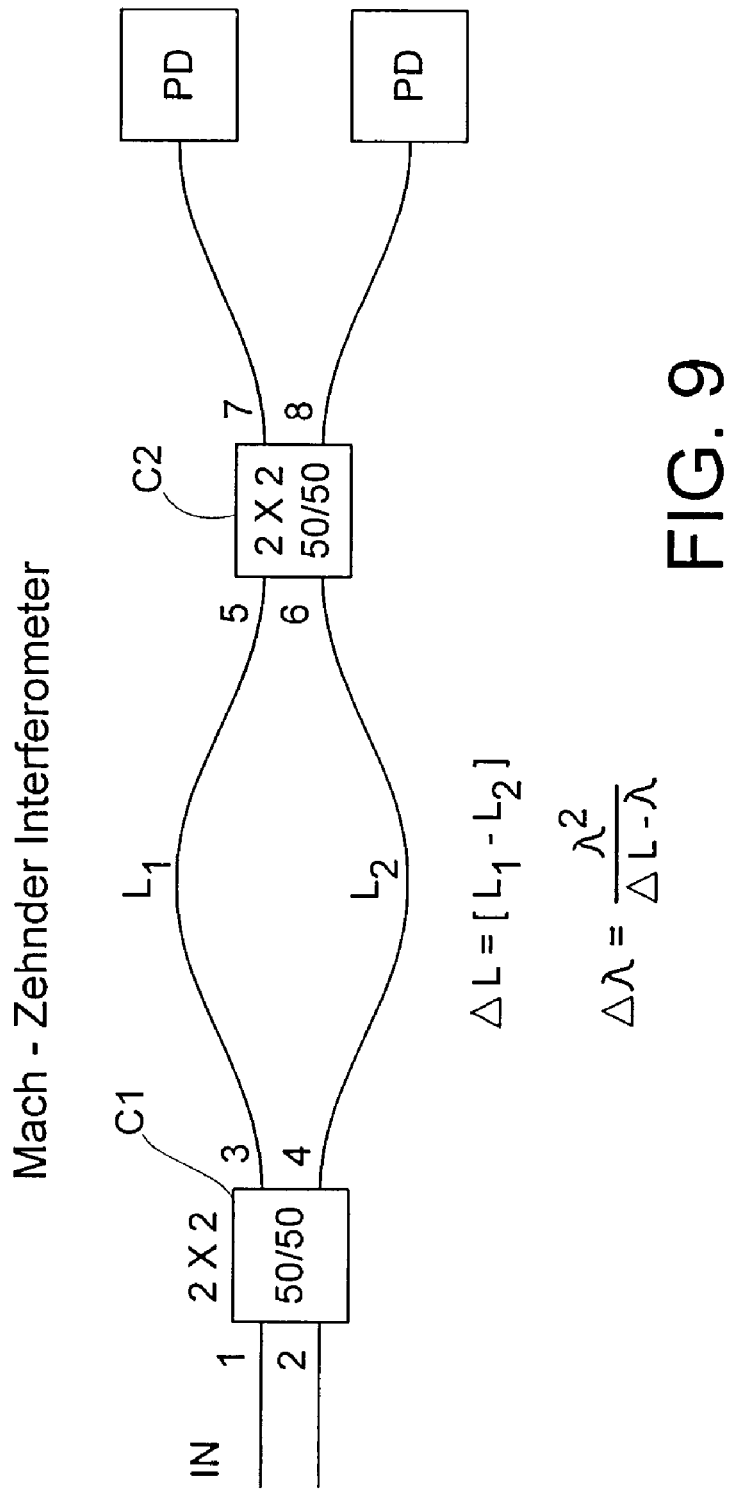
FIG. 9 is an exemplary Mach-Zehnder Interferometer in accordance with aspects of the present invention.

Referring back to FIG. 7, there is provided a second optical path, which goes into a Mach-Zehnder interferometer 104 (identified in the dashed line), which performs a fast Mach-Zehnder function 106 and a slow Mach-Zehnder function 108 and generates fast Mach-Zehnder data and slow Mach-Zehnder data. Referring to FIG. 9, the Mach-Zehnder interferometer 104 is a standard off the shelf 2×2 optical coupler (C1) and a 2×2 coupler (C2) that has two optical inputs and two optical outputs. The couplers C1 and C2 are bi-directional, so input and output references are insignificant. The couplers C1 and C2 can be swapped back and forth. For example, when light is input into a first coupler C1, having input ports 1 and 2 and output ports 3 and 4, the light that comes into port 1 gets split 50/50 between output 3 and 4 and the light that is in input at port 2 gets split 50/50 through output 3 and 4. The Mach-Zehnder interferometer 104 may be considered as a pseudomixer. In one embodiment, the first coupler C1 in the Mach-Zehnder, utilizes only one of the inputs. The other input is not used.

The second coupler C2 uses the two inputs and the two outputs. The fiber that goes from the first coupler C1 to the second coupler C2 traverses two separate paths. One path of L1 and another path of L2 and that difference in length, will be identified as delta L (ΔL), which is equal to the absolute value of L1 minus L2. Delta L determines the interference spacing of the interferometer.

The second coupler C2 has inputs identified as 5 and 6 and outputs 7 and 8. The input light that comes into this device will have a wavelength that changes over time. The changing wavelength will provide constructive and destructive interference on output 7 and 8. Generally, constructive interference may be output on output 7 and destructive interference may be output on output 8 and vice-a-versa. In general, it is desirable to have two differential outputs of optical signal, which may be input into photo detectors (e.g., photo diodes) (PD1-PD4), as shown in FIG. 7. One such exemplary device is a fiber coupled photo detector from Bookham Technology. The device is a pre-standard type of device, which converts the light to electrical current. It is desirable to output a differential signal because if the optical power at the input fluctuates, which commonly happens, it is generally not desirable to use such a signal. Instead, it is preferred to use a differential signal because the interference pattern is of particular interest.

Figure 10:
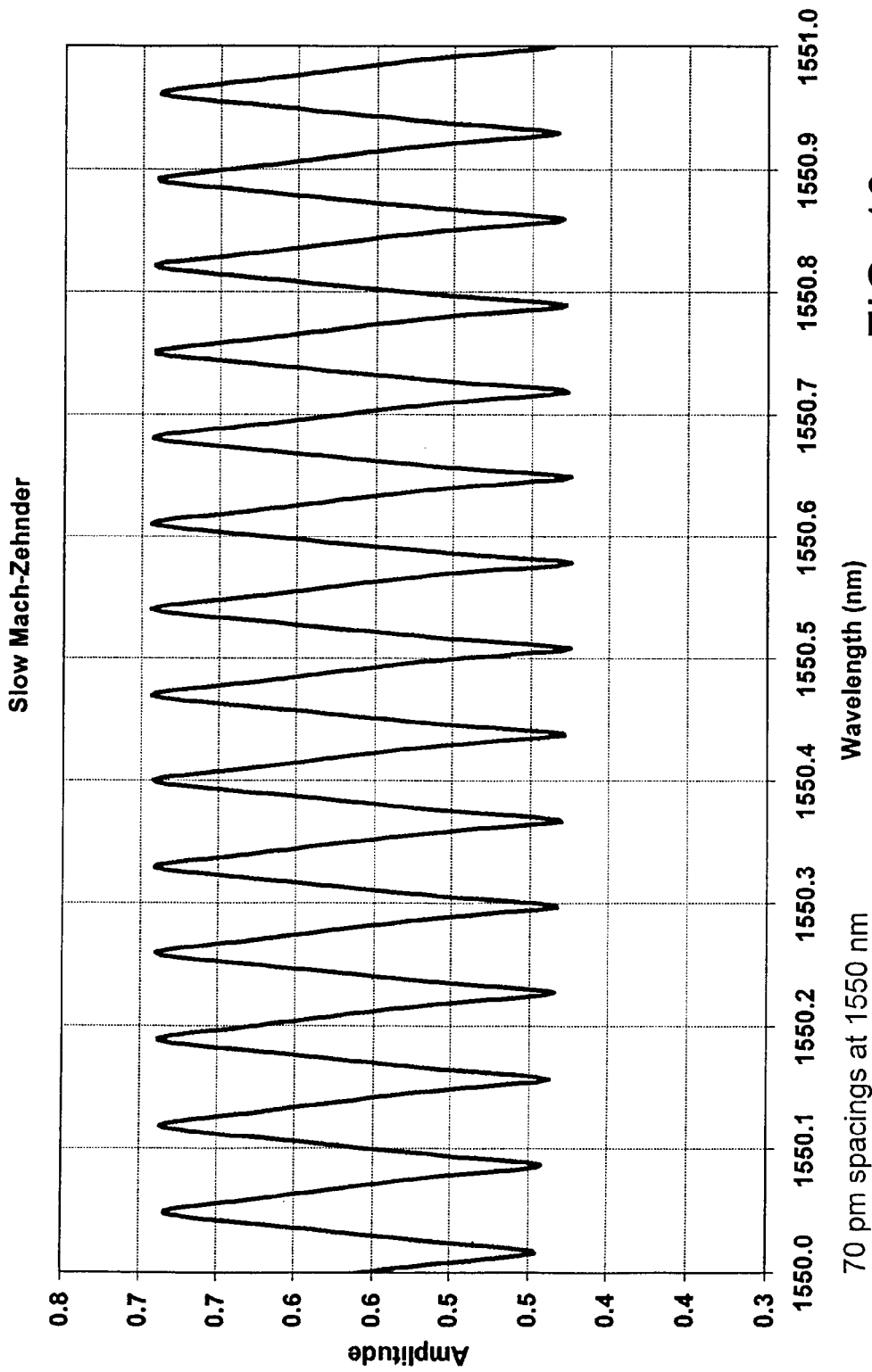
FIG. 10 is an exemplary graphical representation of amplitude versus wavelength for a slow Mach-Zehnder in accordance with various aspects of the present invention.

FIG. 10 illustrates an exemplary interference pattern as wavelength changes. FIG. 10 is referred to herein as a slow Mach-Zehnder output. The interference pattern shown in FIG. 10 originates from the from the photo detector all the way through the A/D converter, which is generally coupled between the detector 12 and the computer 13, and output of the A/D converter may then scaled on a scale of 0 to 1. Accordingly, FIG. 10 illustrates the interference pattern after it has been sampled by the A/D converter and is data that resides or is otherwise made available in the component spectrum analyzer.

It is the difference in path lengths that determines the periodicity (e.g., spacing) of this Mach-Zehnder signal. For example, in FIG. 10, the grid spacing is 100 pm per division and there is approximately 70 pm spacing of between cycles of the interference fringe.

The change in wavelength is generally governed by the equation:

$$\Delta L = |L_1 - L_2|$$
$$\Delta \lambda = \frac{\lambda^2}{\Delta L - \lambda}$$

The spacing between interference fringes may be referred to as a free spectral range and free spectral ranges are generally provided in terms of frequency, megahertz or gigahertz. However, it may be desirable to refer to wavelength in terms of nanometers, it is generally much more useful to view the free spectral range in terms nanometers and/or picometers, at a fixed wavelength.

Referring back to FIG. 7, the optical signal that comes is input to the coupler 110, which is a 50/50 coupler is split into two 50% signal paths. One portion of that signal is routed to the gas cell 102. The other side is routed to another 50/50 coupler 112 and that 50/50 coupler gets split again into a fast Mach-Zehnder 106 and a slow Mach-Zehnder 108. The coupler 114 is another 50/50 coupler for the gas cell. One output of coupler 114 is routed to the gas cell 102 and the output simply goes straight to a photo diode (e.g., PD6), which yields a differential optical signal. As stated above, the purpose of the differential optical signal is to subtract out any of input power fluctuations that may occur. Since some lasers are more stable than others and aspects of the present invention relate to providing a robust system that may be utilized in connection with a wide assortment of lasers, providing a differential optic signal is desirable. Another benefit from the differential signal is that it is possible to amplify the differential signal to obtain an improved signal noise ratio on what ultimately gets sampled by an A/D converter.

Referring back to FIG. 8 an insertion loss signal is illustrated. An insertion loss by definition is a relative measurement. In FIG. 7, the photo detectors associated with the Mach-Zehnder are labeled PD1, PD2, PD3, PD4, PD5 and PD6. PD1 and PD2 are associated with the fast Mach-Zehnder function; PD3 and PD4 are associated with the slow Mach-Zehnder function; and PD5 and PD6 are associated the gas cell signals. The illustrated insertion loss is on FIG. 8 is PD6 minus PD5, which is computed in the units of decibels (dB).

Figure 11:
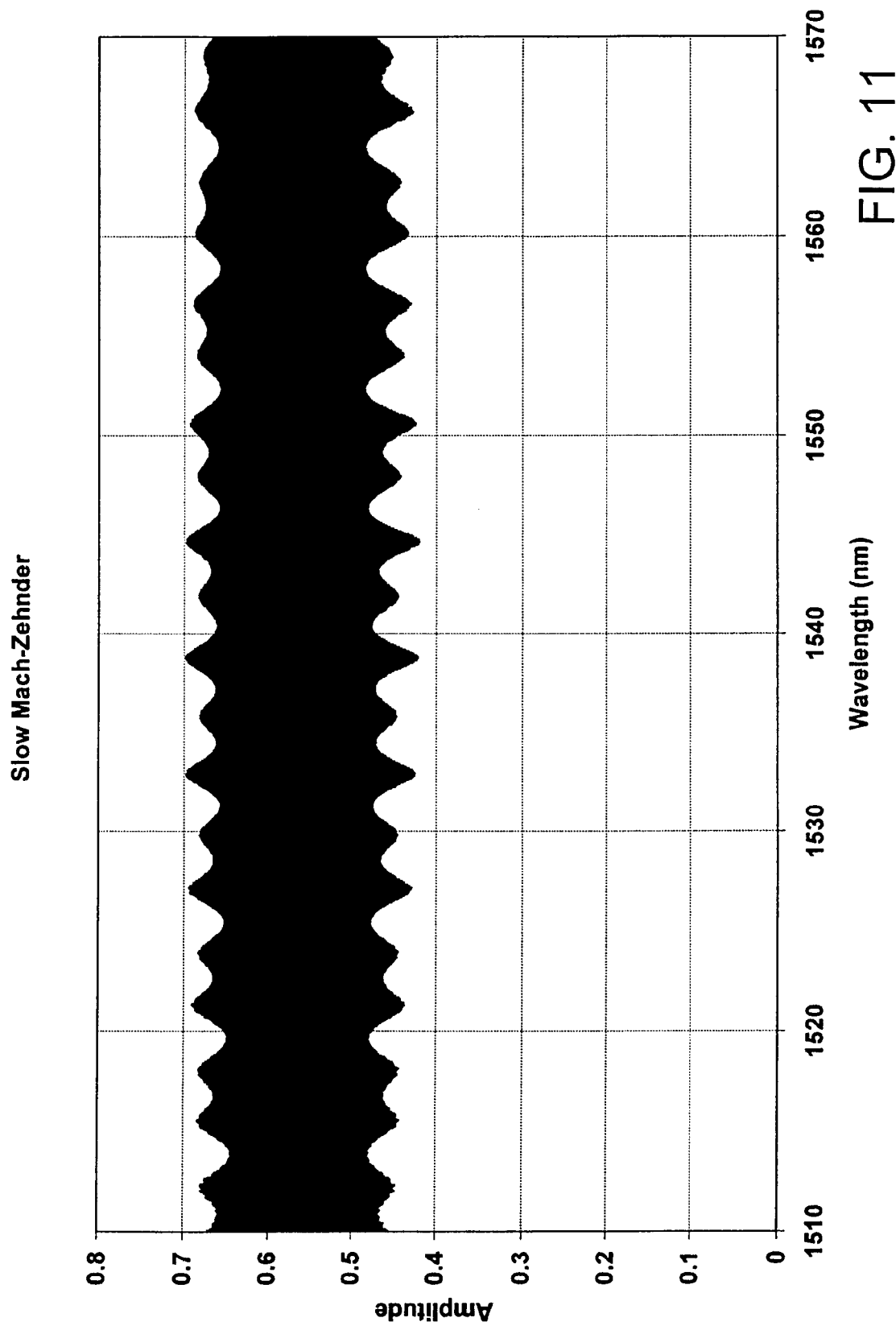
FIG. 11 is an exemplary graphical representation of differential outputs of the slow Mach-Zehnder transformation in accordance with aspects of the present invention.

Referring now to FIG. 11, the differential output of the slow Mach-Zehnder 108, which is the output of photo detector 4 (PD4) minus the output of photo detector 3 (PD3), is shown. The signal is scaled so it ranges from 0 to 1 and nominally falls in the middle of the range. FIG. 11 is a plot of that slow Mach-Zehnder (SMZ) signal from 1510 to 1570 nanometers. FIG. 11 illustrates that the amplitude of that signal, the envelope inside which that signal falls does vary with frequency and the amplitude of that signal is like measuring, is a measure of how good your interferometer is. If the interferometer is symmetrical, a strong signal is generally available. It is kind of like the quality "Q" of a circuit (e.g., finesse).

Referring back to FIG. 8 a spacing of 70 pm spacing at 1550 nm is shown. The fast Mach-Zehnder (FMZ) has the same general characteristic curve as FIG. 8, except the spacing is much tighter. The difference between fast and slow Mach-Zehnder transforms is that the fast Mach-Zehnder is used to interpolate wavelength between gas cell lines. Since, it is known that each interference fringe occurs at a certain space, and that spacing is fixed in frequency domain, and wavelength varies in the domain, interpolation may be used to convert the wavelength lines of the gas cell to frequency domain and the interference fringes from the fast Mach-Zehnder signal.

From the gas cell signal, the absolute wavelength is known based on the fast Mach-Zehnder transformation. It is now possible to interpolate the knowledge of wavelength to the remainder of samples. If no mode hops occur, the wavelength is known and the process may be terminated. However, in reality it is known that one or more mode hops will occur. One purpose of the slow Mach-Zehnder signal is to detect the mode hop. Because mode hops vary roughly between a range of about 10 to 50 pm, a fast Mach-Zehnder of about 0.65 picometer spacing, would generally not be able to determine the magnitude of a jump of 10 picometer or the direction of the jump (e.g., whether it was up or down). A slow Mach-Zehnder with the wider spacing is generally needed for such detection.

Referring to FIG. 8, the slow Mach-Zehnder has a spacing of 70 picometer at 1550 nanometers and so the implications for mode hop detect are that it is capable detecting mode hops as big as 35 picometer with such spacing. For example, if there were a mode hop of 10 picometer, a discontinuity in the slow Mach-Zehnder signal would be apparent and, based on the discontinuity, it could be determined whether that mode hop, that jump in wavelength was either up in wavelength or down in wavelength.

Thus, the slow Mach-Zehnder signal is used to discover discontinuities due to mode hop. A variety of methods may be used to evaluate the discontinuities. Two exemplary methods are now identified. The first method is to simply calculate and evaluate the midpoint of the Mach-Zehnder signal, both the rising and the falling midpoints. When there is a discontinuity in the periodicity of that signal then it is known that this a mode hop region. For example, if the sampling rate occurs at a fixed time interval (e.g., 100 nanometers per second) and the nominal sweep rate is sufficient, the Mach-Zehnder signal is not going to vary a large amount above or below the midpoints. Therefore, it is possible to measure the period of that signal in terms of number of samples and if a large jump in the period of that signal is detected, then it is known that this is a region of the mode hop.

Another method for determining the region of mode hop is to look for discontinuities by looking at the second derivative of the signal in a particular region. Because it is a sampled signal, this signal could actually be called the second difference of the signal. So when there is a mode hop, it stands out strongly in the second difference of the signal. Once the region of the mode hop has been determined, the next step is to look at the data before the mode hop, in the slow Mach-Zehnder signal, and the data after the mode hop. A determination is made as to how much the slow Mach-Zehnder signal has to be shifted so that the periodicity in the signal is restored. The data is shifted by determining out how much of a shift has to be applied to the signal for that period of CDV to be restored. For example, it may be determined that at sample number 1,000, a mode hop has occurred. Next, the signal may be shifted (e.g., plus 10 samples) and determine the corresponding fast Mach-Zehnder data and by actually shifting that data by ten samples. Effectively, the values of the fast Mach-Zehnder data are changed for that point of the mode hop through the rest of the sweep, through the end of the sweep. Next, the slow Mach-Zehnder signal is scanned again; starting the scanning from the start wavelength, moving toward the stop wavelength. If another mode hop is determined, the process is repeated again. Accordingly, this method may be used to detect multiple mode hops.

The output of a comparator may be routed to a logic circuit, wherein the output of the logic circuit yields a pulse. Two pulses may be generated for each cycle of the fast Mach-Zehnder. Based on the above example, this yields two pulses for every 0.65 picometer, which also corresponds to one pulse for every 0.325 picometer. The pulses are input into a 16 bit counter, which may be read instead of reading a 16 bit A to D converter. Each count of the counter corresponds to a fraction of the fast Mach-Zehnder cycle and becomes the fast Mach-Zehnder data.

Figure 12:
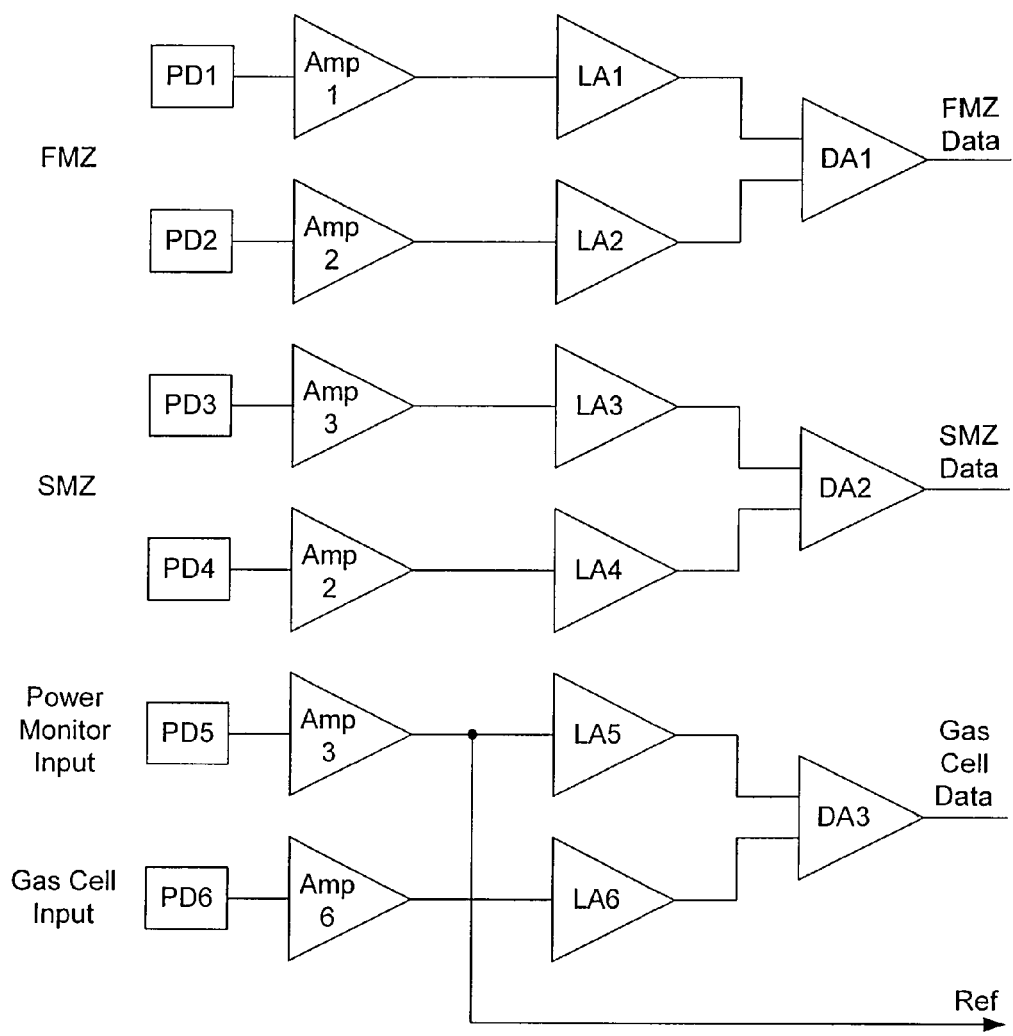
FIGS. 12-15 are exemplary schematic illustrations of hardware suitable for carrying out various aspects of the present invention.
Figure 13:
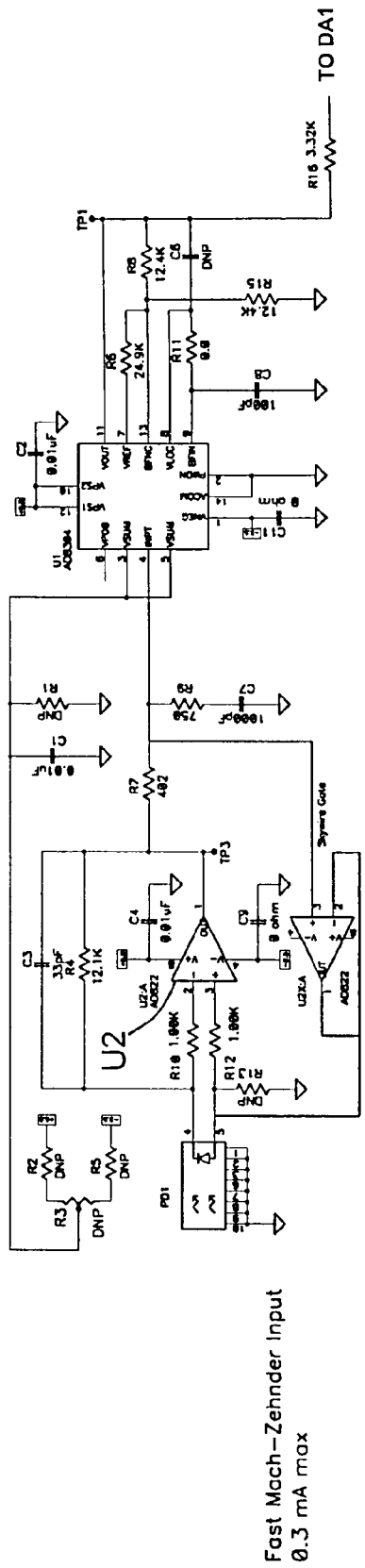

Referring to FIG. 12, an output signal from the six photo detectors (PD1-PD6) is routed an amplifier (Amp 1-Amp 6) and this amplifier takes the output current from the particular photo detector, which nominally has 0 volts bias across it, and amplifies that current on the output. A schematic view of one of the amplifier is illustrated in FIG. 13. FIG. 13 is a schematic view of PD1 and Amp 1, illustrated in FIG. 12. There is a voltage on test point 3 of U2-A. If there is a voltage relative to pin 5 of the photo detector (PD1) then current is output through R7, which basically provides a feed back circuit by the combination of U2A and U2XA amplify the current signal of PD1, in order to get a better signal noise ratio. This amplifier configuration is essentially repeated six times, once for each photo detector.

Referring back to FIG. 12, the signal output from the amplifiers (Amp 1-Amp 6) is input to a logarithmic amplifier ("log amp") (e.g., LA1-LA6). An exemplary log amp is manufactured by Analog Devices. Basically, the output of log amp is an output voltage as a function of the log of the input current, which achieves a wide dynamic range that enables operation over wider optical power levels. As shown in FIG. 12, there six (6) log amps (LA1-LA6), once for each photo detector (e.g., PD1-PD6).

The output of the log amps goes into another amplifier, which is configured to be a differential amplifier (e.g., DA1-DA3). In the differential amplifier, the difference between two signals is taken. For example, the fast Mach-Zehnder input, which is coming in through PD1 and PD2, is amplified through there separate signal paths to the differential amplifier DA1 and the difference of those two signals is then output from the differential amplifier, which generates fast Mach-Zehnder data. The same process is completed for the both the slow Mach-Zehnder (e.g., PD3 and PD4 signal paths), which is output from DA2 and generates slow Mach-Zehnder data, and the gas cell (e.g., PD5 and PD6 signal paths), which is output from DA3 and generates gas cell data.

It is often desirable to observe the reference signal to determine reference lag. As shown in FIG. 12, the power monitor input signal (e.g., PD5) may be chosen as the reference signal. After the PD5 signal has been amplified (e.g., Amp 5), the amplified signal may be used to measure as a proxy for input power to the wave reference module. Each of the electrical components listed above (e.g., Amp 1-Amp 6, Log Amp 1-Log Amp 6, Differential Amplifier 1-Differential Amplifier 3) may be mounted on a single circuit board. The board may also include a temperature sensor that provides another electronic measurable signal.

Figure 14:
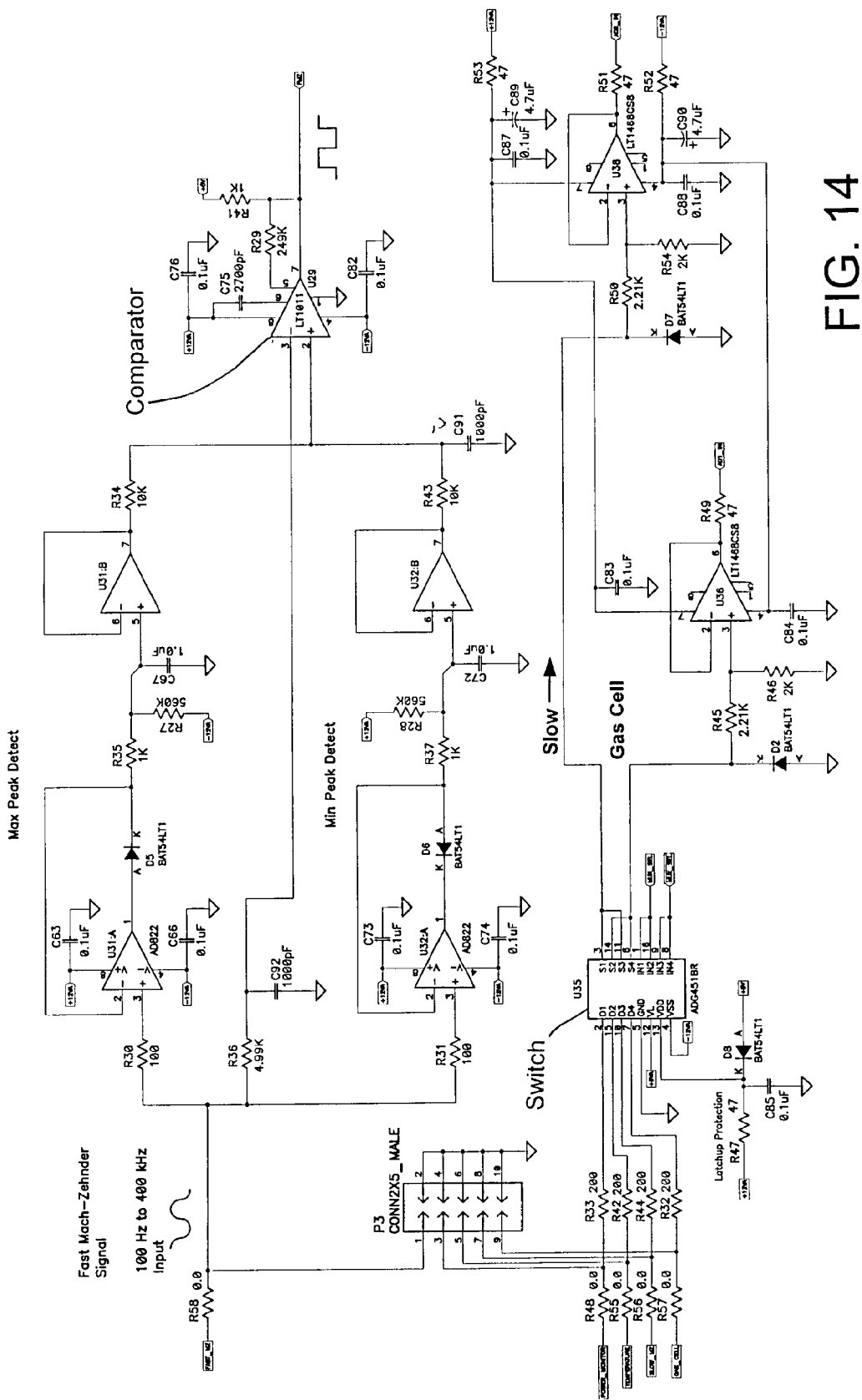

Referring to FIG. 14, on the left side of the schematic there are five single ended inputs, fast MZ, which is the fast Mach-Zehnder, power monitor, temperature, slow Mach-Zehnder and gas cell. Referring to the slow Mach-Zehnder and the gas cell signals. Those signals basically come into U35, which is an analog switch. When a measurement is being made U35 is controlled to pass through the slow Mach-Zehnder and the gas cell signal, which allows those two signals then get passed through to buffers U36 and U38. The buffers U36 and U38 are used to drive input to A/D converters. There is an AD1 input and an AD2 input, as shown in FIG. 15.

The fast Mach-Zehnder function, which is the upper left corner of FIG. 14 goes into a circuit whose output is labeled FMZ and the output is a TTL square wave signal. So what is coming in, is something that looks like a analog signal that can look like a sine wave or really more typically is going to look like a triangle wave as shown in FIG. 10 and whose voltage would be in the range from 0 to 5 volts. Now referring back at FIG. 14, the overall envelope that the signal follows varies and so the signal is split into three paths. The top path goes through a maximum peak detector, the bottom path goes through a minimum peak detector, which track the envelopes of this wave form. Once the maximum and minimum are known then those two signals are basically summed through R34 and R43. R34 and R43 puts the average of those two signals at pin 2 of the comparator U29, as shown in FIG. 14. In other words, the voltage at R34 at the input R34, roughly tracks the peek of the envelope of the signal that is observed on FIG. 11 and the input to pin R43 is tracking, instead of the peak it would be the valley, or the minimum of the signal. A design consideration is to have the comparator U29 at the midpoint, half way between the peak and the valley to be the point at which the comparator changes state.

Figure 15:
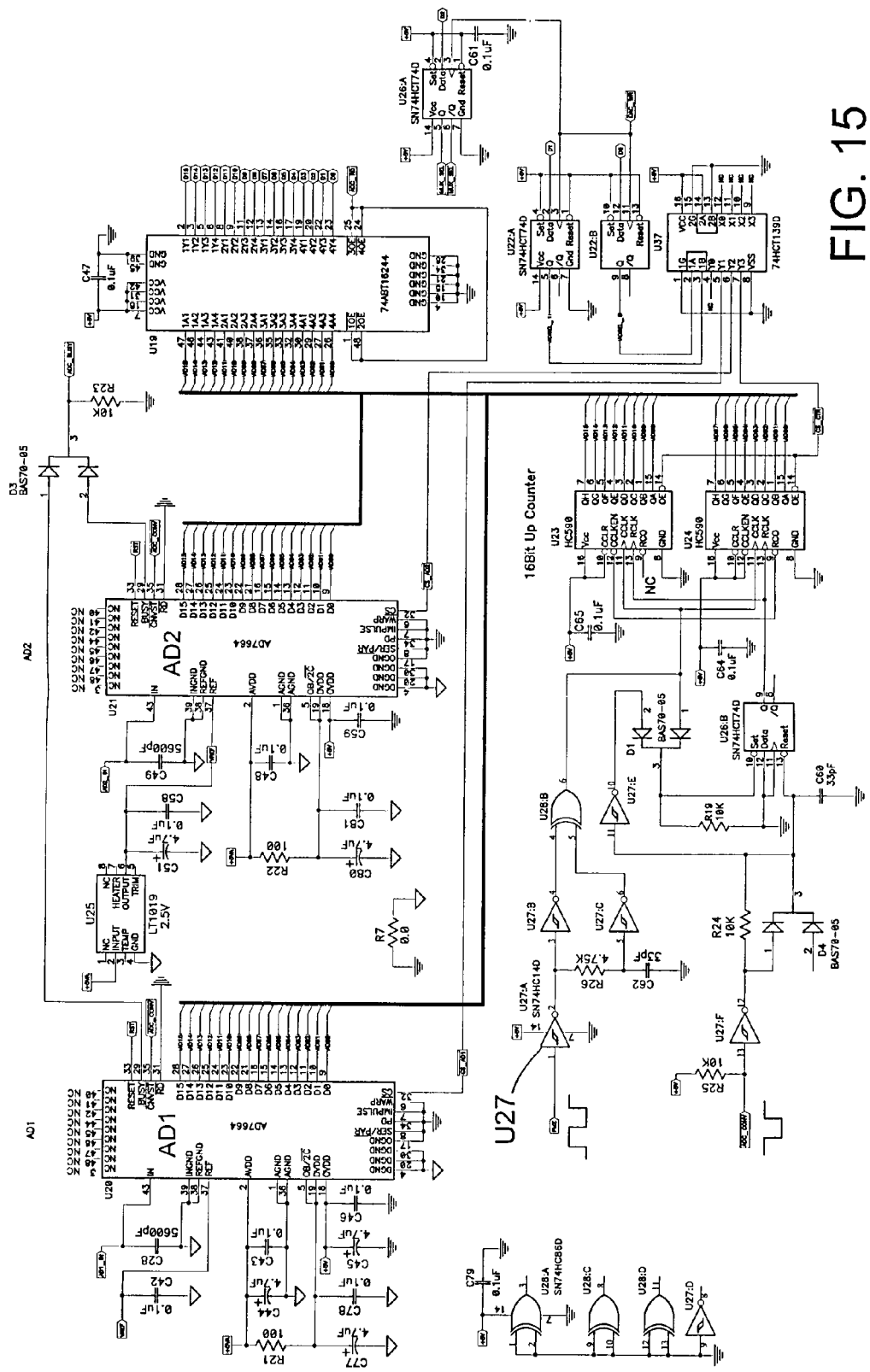

Referring now to FIG. 15, the fast Mach-Zehnder signal is input into a Schmidt trigger (U27), which is one of many ways to obtain the functionality desired. The purpose of this first part of the circuit is simply to generate a pulse on each transmission of the FMZ signal because it is desirable for the counter to increment on both the positive transitions and the negative transitions of the FMZ signal of the logic signal. The Schmidt trigger (U27) generates a short pulse on each edge of the signal and then it feeds those pulses into 16 bit up counter and that 16 bit counter is built using two 8 bit counters cascaded, which are identified as U23 and U24 in FIG. 15. So the FMZ signal goes into this 16 bit up counter. One feature of the counter is that the counter will continue to count as long as it is getting input pulses, but the counter also has an output data latch, which can be synchronize the counts with the exact same time that the A to D converters are being sampled and that is done with this aid, so we take the ADC conversion signal on this board and that is what this signal is here and so that is what this circuitry does is, it basically latches the count value in the counter over to the output data latch. Now the output data latch is later read when the chip select signal CS_CTR goes low and that is when that is actually read out. In this instance, it is generally very important that the value in the counter gets latched at the same time as the A to D conversion. So we have two A/D converters, AD1 and AD2 (shown in FIG. 15) and those two A/D converters start their A/D conversions at the same time as the data is latched in the counter. So all three devices are synchronized with the one signal ADC_CONV.

The output of AD1, AD2 and the counter is on a 16 bit data bus which then gets read by a digital signal processor that communicates to the rest of the components that are part of the hardware described herein. During a measurement, there are basically three streams of data. The slow Mach-Zehnder data signal which is a 16 bit analog signal—it is a 16 bit digital signal from an A/D conversion. The gas cell signal, which is a 16 bit A to D result from the gas cell and then the fast Mach-Zehnder data signal, which provides counts and each count corresponds to certain amount of change and wavelength. Now to be precisely correct, it is really a change in frequency because the free spectral range of a Mach-Zehnder is fixed in frequency and varies in wavelength.

Software:

The wave reference channel hardware actually has a digital signal processor (DSP). As explained above, there are three data sets, including: the gas cell, the fast Mach-Zehnder and the slow Mach-Zehnder data.

The mode hop correction is generally not done simultaneously to the power measurements that are being done. The power measurements are the measurements that are being used to characterize the object. Basically, a sweep is performed, data is colleted stored in RAM, processed and, optionally, may be output to the user in user readable form. It is in the post processing period that the method is generally applied. A determination is made as to whether a mode hop has occurred, if so, the mode hop is quantified to correct the wavelength data.

Data is usually collected as a function of time and since a sweep may take a tenth of a second or one second or ten seconds, for example, we know exactly when each data reading is taken. Because one objective is to correlate optical power measurements with wavelength and since we are not measuring wavelength directly, we generally infer it from other measurements. During this post processing, we look at the slow Mach-Zehnder data for any discontinuity that would indicate a jump in wavelength.

Figure 16:
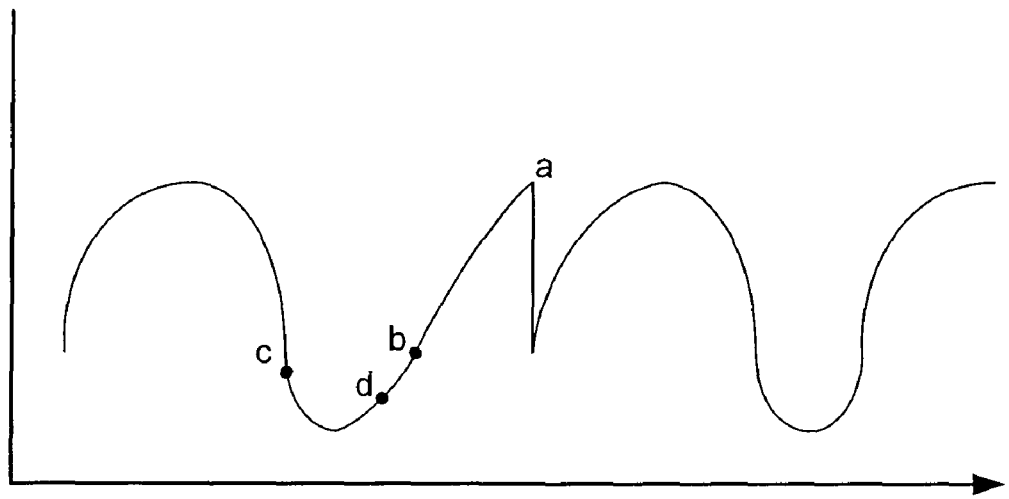
Figure 17:
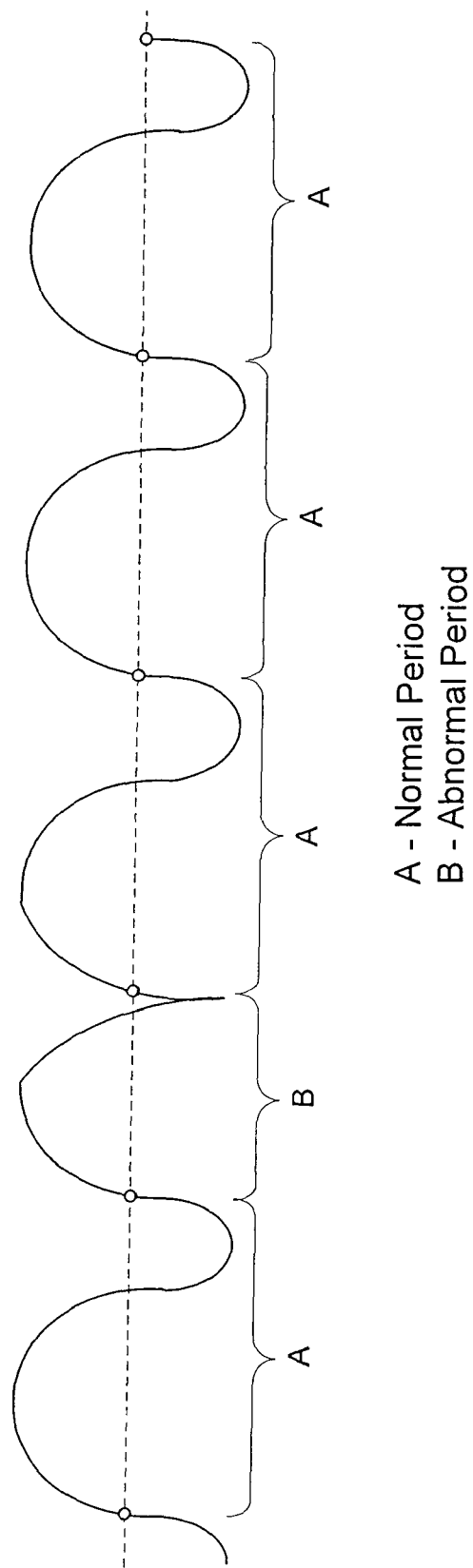

FIG. 16 provides an exemplary slow Mach-Zehnder signal with mode hop or with a jump in wavelength is illustrated. FIG. 16 is an example of what the SMZ signal would look like if wavelengths jumped backwards in the sweep. FIG. 17 illustrates a mode hop, which is a jump forward. There are any number of algorithms that may be designed to find these discontinuities in the SMZ signal. For example, one such algorithm scan through the entire SMZ data set and computes the second difference, which for discreet data is like the second derivative and keeps track of the maximum second difference and the minimum second difference, but not the absolute maximum. The absolute maximum is generally filtered with an IRI filter, which generally determines a range of wavelengths, in the software. This is performed in order to determine the normal amount maximum value that is normally seen, so that any outliers may be found. For example, generally the algorithm searches for a data point in the set where the second difference deviates significantly from the bulk of the data set. One of ordinary skill in the art will readily appreciate that this may be accomplished in a number of ways. For example, the algorithm may scan through the data, each time we find an anomalous point in the SMZ signal, the algorithm may save the reading number where that point is and then we jump away from that point by a fixed number of readings. It is desirable to jump away from that point because it is generally not desirable to just increment to the next reading and find another anomalous second derivative and then store two points close together that really have occurred during one mode hop. That is, it is generally not desirable to find the same mode hop twice. Therefore, the algorithm jumps away from point and then starts scanning the data again. This process is continued through the end of the data set and list of index numbers where anomaly occurred is generally maintained and/or stored.

Another method involves adding to the list of index numbers discussed above. If the algorithm finds any points with the second method that are already in the list, they are generally ignored because they were already found that point and the process continues through all of the remaining data points.

So the second method is simply to measure the period of the slow Mach-Zehnder data signal. Referring to FIGS. 16 and 17, dotted lines have are provided through basically the middle of the signal of FIG. 17. Positive flow occurs where the signal has a positive crossing across that dash line. Period A is a normal period and B is an abnormal period. Thus, when a mode hop occurs or a jump in wavelength is detected, the period of the signal is going to change when it is measured by this method.

Figure 18:
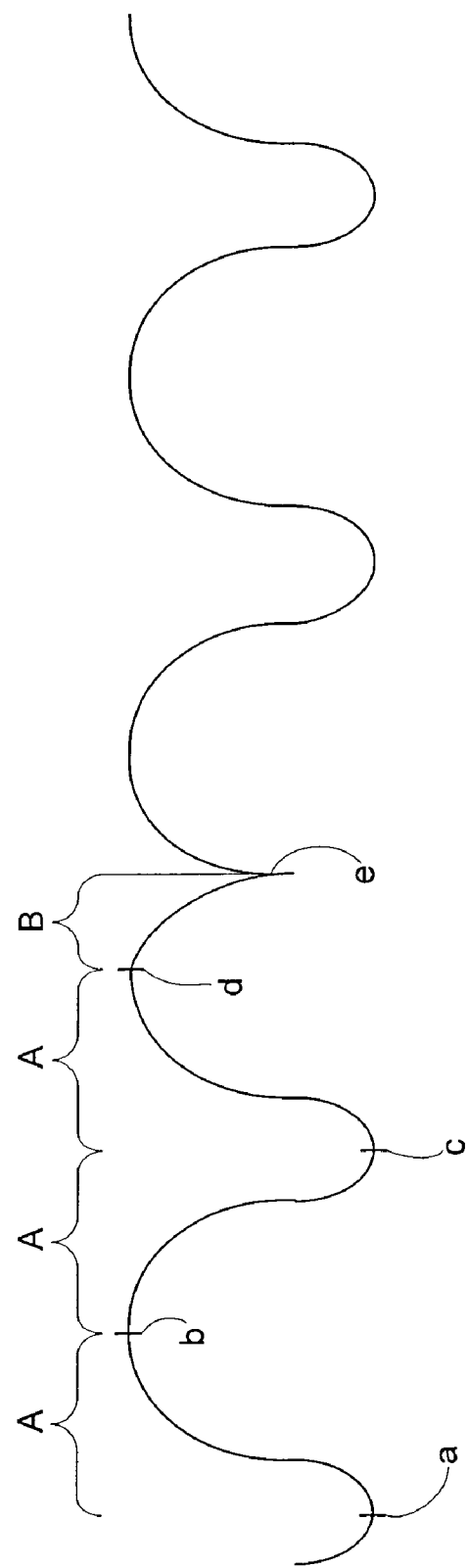

Referring to FIG. 18, a slow Mach-Zehnder signal illustrated. FIG. 18 illustrates another method for determining if a mode hop occurred and identifying where the mode hop occurred. In this method, an algorithm searches through the data to find a local minima in the data, referred to as Point a. A search of the data continues to find a local maxima, Point b. The number of readings from Point a to Point b is shown as capital "A" and that is a normal half cycle. The data is continued to be searched until another minima, which is labeled Point c and then the difference between Point b and Point c is again A, which is a normal half cycle of time.

The search continues to maxima point d. Again that is a normal half cycle and then the algorithm searches until a new minima is found (e.g., at Point e). Point e is the point where the mode hop occurred and the time from Point d to Point e is clearly anomalous (i.e., the half cycle period is different from earlier detected half cycle periods), which identifies where the mode hop occurred and this point is stored in a list.

Figure 19:
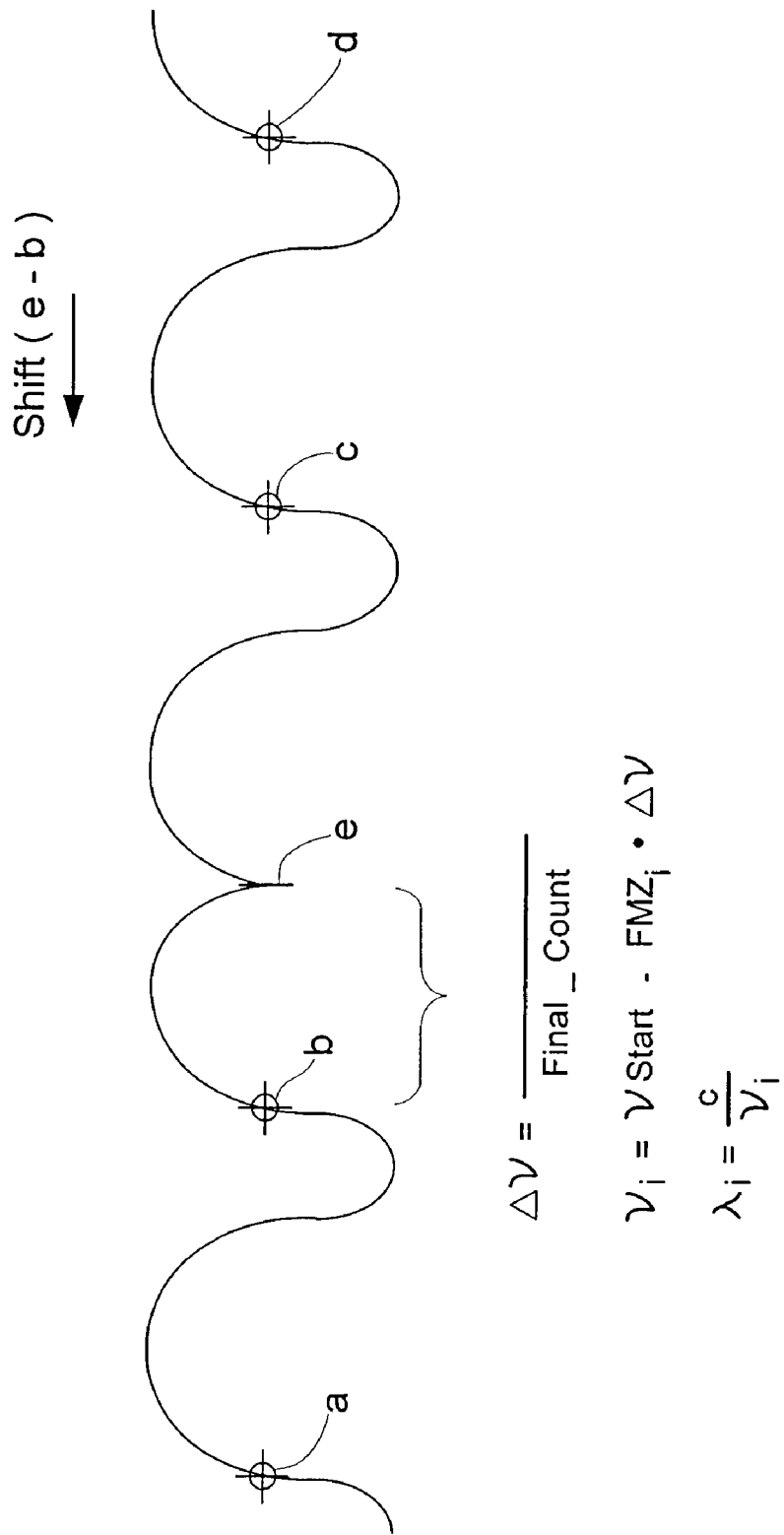

So now that the mode hops are identified, it is next desirable to determine the magnitude of the mode hop. Referring to FIG. 19, the location of the mode hop is known and the algorithm looks backwards from that point to find the two most recent positive mid point crossings. So the mode hop is again labeled as point e and we search backwards and find mid point crossings Point a and Point b. And then from Point e, the algorithm may search forward and find mid-point crossings at Point c and Point d.

Referring to FIG. 20, a chart of FMZ counts versus time is illustrated. Assuming, a mode hop occurs at Point e, the fast Mach-Zehnder counts and subtracts the difference in counts at Point b from Point e, which yields ΔFMZ. ΔFMZ is equal to the FMZ counts at Point e minus the FMZ counts at Point b from FIG. 19, which is the original FMZ data and the dashed line on FIG. 20 illustrates the corrected FMZ data and this amount here is Delta (Δ), which is the change in counts.

Then the next step in the process is to find all the gas cell lines and the gas cell data. In order to determine the magnitude of the mode hop in wavelengths units, somewhere in the system, it is desirable to know or make an approximation of how much each FMZ count is in change in the frequency domain, but each FMZ step will have a constant change in frequency, which can be correlated to wavelength.

For example, assume there is a total of N readings in the data taken. It is known to start at a starting point wavelength, λstart. The end point wavelength is also known, (e.g., λstop). The FMZ count is zero, the first count reading is by definition set to 0, and then the FMZ count of N minus 1 is equal to total counts. From λstart, the new starting wavelength is: equal to c over λstart and new stop equals C over λstop.

For purposes of clarity, the mode hop detection and correction method is summarized below:

An optical signal may be tapped off of the TLS with a 95/5 coupler, with 95% of the light going to the rest of the measurement system and 5% going to the wave reference optics module. The wave reference optics module splits the light into several optical paths using standard 50/50 couplers. The first optical path is a Fast Mach-Zehnder Interferometer (FMZ). The FMZ is built using two 50/50 couplers. There are two optical paths between the couplers. The difference in length between the two paths determines the FSR of the interference fringes. In our case, we use a delta path length of 2.34 meters which has an FSR of 0.65 picometers at 1550 nanometers wavelength. The output of the FMZ is a differential optical signal at photo detector 1 (PD1) and PD2. The second optical path is to what is referred to herein as a slow Mach-Zehnder signal (SMZ). The SMZ is built the same as the FMZ except that a different delta path length is used. In practice we actually use a delta path length of 0.000 meters which empirically gives us and FSR of about 160 picometers at 1550 nanometers wavelength. The differential output of the SMZ is connected to PD3 and PD4. The third optical path is to a gas cell. The gas in the gas cell absorbs light only at certain wavelengths and so as wavelength is swept we see an absorption spectra dependant upon the gas in the cell. These absorption spectra are based on physical properties and provide the best reference for determining absolute wavelength accuracy. The gas cell also has a differential output and is connected to PD5 and PD6. Differential outputs are used in the three devices above so that noise in TLS optical power can be referenced out of these signals and gives us a much better signal to noise ratio on these signals, which is not required but is certainly preferred. Optical power is converted to current in the photo detectors (PD1-PD6). Photo detectors will typically convert optical power with a conversion ratio of 0.7 to 1.0 amps output per watt of optical power. Because of the optical power levels described herein, the TLS is expected to operate at and the optics described above. The maximum output current of the photo detectors is generally about 0.3 milliamps. The pre-amplifier stage has been designed to increase this signal level by a factor of 30×. The pre-amp is not required but is preferred because it allows operation over a wider dynamic range of TLS output power. As described above, Amp 1 through Amp 6 are an operational amplifier circuits that achieve this 30× current gain. After the pre-amp, the signal enters a current to voltage logarithmic converter circuit. The main component of this circuit is an AD8304 chip from Analog Devices. It is preferred to convert the signal to a logarithmic scale so that operations may be performed over a wide dynamic range of TLS optical power and also a wide dynamic range of MZ signals. The differential MZ signals can be as large as 20 or 30 dB. The resistor and capacitor values connected to the AD8304 are chosen to provide optimal signal scaling and a simple low pass filtering of the signals. The next step in the signal processing is to take the difference of the differential inputs and add an offset. The output yields three principal signals: 1. Fast Mach-Zehnder; 2. Slow Mach-Zehnder; and 3. Gas Cell (GC) Signal Sampling. The GC and the SMZ signals are sampled with a 16-bit A/D converter, an AD7664 from Analog Devices. The maximum sample rate is 100 kilohertz. It may be preferable to sample at slower rates or average multiple samples into readings when the TLS sweeps at slower than maximum speeds. The FMZ signal is converted from an analog signal, denoted as FAST-MZ on the schematic, to a logic level signal, denoted as FMZ on the schematic. A max peak and min peak detect circuit are used to track the maximum and minimum FMZ signal level. The average of the max and min levels is presumed to be the middle of the FMZ signal level. This midpoint level is input to a comparator which converts the periodic FMZ signal to a square wave logic level signal. One full square wave cycle corresponds to approximately 0.65 pm of wavelength change. The logic level FMZ signal then enters a counting circuit. Each rising and falling edge of the FMZ signal is converted to a short pulse. These pulses then enter a 16 bit up counter, wherein each pulse corresponds to approximately 0.325 pm of wavelength change. The internal count stored in the counter is latched to the output register on ADC-CONV, effectively sampling the FMZ signal. The FMZ signal is sampled with a hardware counter rather than an A/C converter because at sweep rates of 200 nm/s pulses at a rate of about 615,000 pulses per second would occur, which are too fast for the A/D and system software to effectively operate. All three signals are sampled at the same time as determined by the ADC-CONV control line. During a sweep, these signals are sampled at a fixed rate. That rate is variable depending upon the sweep rate setting of the TLS. If the TLS is sweeping slow enough, multiple samples will be averaged before being stored as a reading. The software that controls signal sample rates is designed so that the maximum spacing between readings is 5.0 picometers or the measurement resolution as specified by the user, whichever is smaller. Five (5.0) picometers was chosen as the maximum reading spacing because it is desirable that have at least that good a resolution on the GC data to be able to accurately resolve the gas cell absorption lines. During the measurement, these readings are stored for later post processing by the software and correlation with the other channels of measurement data.

After the measurement has completed, the next step is to process the signals and determine if a mode hop has occurred and take corrective action if a mode hop has occurred.

INDUSTRIAL APPLICATION

It will be appreciated that the invention may be used to characterize optical components while compensating the measurements for mode hop wavelength error, if such should occur in the TLS or the like of the measurement system.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A method of testing an optical device, comprising:
   directing incident electromagnetic energy over a range of wavelengths to an optical device,
   detecting electromagnetic energy from the optical device to obtain data for characterizing the optical device, and
   correcting the data for mode hop wavelength error by evaluating anomalous data signals in the obtained data, wherein the obtained data is analyzed after the incident electromagnetic radiation has swept completely over the range of wavelengths.

2. The method of claim 1, said directing comprising directing a tunable laser source.

3. The method of claim 1, said directing incident electromagnetic energy comprising sweeping the wavelengths over a continuous range.

4. The method of claim 1, said directing incident electromagnetic energy comprising sweeping the wavelengths over a range defined by a series of wavelength steps.

5. The method of claim 1, said directing comprising directing incident electromagnetic energy to an optical device for a telecommunication system.

6. The method of claim 1, said directing comprising directing incident electromagnetic energy to an optical device comprises directing such incident electromagnetic energy to a passive optical component.

7. The method of claim 1, said directing comprising directing incident electromagnetic energy to an optical device comprises directing such incident electromagnetic energy to a fiber optic device.

8. The method of claim 1, said detecting electromagnetic energy comprising using a photo sensor to sense the electromagnetic energy.

9. The method of claim 1, said detecting comprising detecting over a range of wavelengths.

10. The method of claim 1, further comprising correlating measurement data with anticipated wavelength.

11. The method of claim 1, said directing incident electromagnetic energy comprising sweeping a tunable laser source over a range of wavelengths to provide such incident electromagnetic energy.

12. The method of claim 11, further comprising coordinating detecting with sweeping of the laser wavelength.

13. The method of claim 1, further comprising detecting mode hop occurrences.

14. The method of claim 1, further including calculating a derivative of the obtained data to determine the anomalous data signals in the obtained data.

15. A method of correcting mode hop wavelength error in data obtained measuring optical characteristics over a range of wavelengths, comprising
   detecting a mode hop wavelength error in an assemblage of data, wherein the assemblage of data represents optical characteristics associated with wavelength of incident electromagnetic energy applied to a device under test after the incident electromagnetic energy has swept completely over the range of wavelengths, and
   shifting one or more data values in the assemblage of data to improve correspondence of assemblage of data with the wavelength of the incident electromagnetic energy.

16. The method of claim 15, wherein the assemblage of data includes slow Mach-Zehnder data and fast Mach-Zehnder data.

17. The method of claim 16, wherein the slow Mach-Zehnder data is used to detect a discontinuity in the assemblage of data.

18. The method of claim 17, wherein the slow Mach-Zehnder data includes at least one rising midpoint and at least one falling midpoint.

19. The method of claim 18, wherein a difference in a periodicity between the at least one rising midpoint and the at least one falling midpoint indicates the discontinuity.

20. The method of claim 15, wherein the assemblage of data includes fast Mach-Zehnder data.

21. The method of claim 20, wherein the fast Mach-Zehnder transformation is used to determine at least one wavelength associated with the mode hop.

22. The method of claim 21, said shifting comprising fitting the signal previous and subsequent to the mode hop to identify correctly the location of a wavelength discontinuity on account of the mode hop.

23. The method of claim 15, said detecting a mode hop wavelength error occurs after the assemblage of data has been accumulated.

24. The method of claim 16, shifting data to improve correspondence of the data with the wavelength of the incident electromagnetic energy.

25. The method of claim 24 further including outputting the assemblage of data in a user-sensible formation.

26. The method of claim 24 wherein data was shifted due to the mode hop replaces data associated with the mode hop.

27. A system for testing an optical device, comprising
- a tunable laser source for directing incident electromagnetic energy over a range of wavelengths to an associated device under test,
- a detector for detecting electromagnetic radiation from the device under test to obtain data for characterizing the device under test,
- a storage device communicatively coupled to the detector for storing data representative of one or more optical characteristics associated with wavelength of the incident electromagnetic energy applied to the associated device under test, and
- a processor communicatively coupled to the storage device, wherein the processor executes an algorithm for correcting a mode hop wavelength error detected in the data by evaluating anomalous data signals in the data, wherein the data is analyzed after the incident electromagnetic radiation has swept completely over the range of wavelengths.

28. The system of claim 27, wherein the detector comprises a plurality of photo detectors.

29. The system of claim 27, wherein the data includes slow Mach-Zehnder data.

30. The system of claim 29, wherein the algorithm evaluates periodicity information associated with the slow Mach-Zehnder data to detect a discontinuity in the data.

31. The system of claim 30, wherein the mode hop wavelength error occurs at the wavelength associated with the discontinuity.

32. The system of claim 27, wherein the data further includes fast Mach-Zehnder data.

33. The system of claim 32, wherein the fast Mach-Zehnder data is used to determine at least one wavelength associated with the mode hop.

34. The system of claim 33, wherein the algorithm fits a signal previous and subsequent to the at least one wavelength associated with the mode hop to improve correspondence of the data with the wavelength of the incident electromagnetic energy.

* * * * *